(12) United States Patent
Fang et al.

(10) Patent No.: US 9,961,563 B2
(45) Date of Patent: May 1, 2018

(54) SMALL CELL BASE STATION SYSTEM, AND RELATED DEVICES AND DATA PROCESSING METHODS

(71) Applicant: COMBA TELECOM SYSTEMS (CHINA) LTD., Guangzhou (CN)

(72) Inventors: Shaohu Fang, Guangzhou (CH); Bo Yang, Guangzhou (CN); Wei Xiang, Guangzhou (CN)

(73) Assignee: COMBA TELECOM SYSTEMS (CHINA) LTD., Guangzhou (CN)

( * ) Notice: Subject to any disclaimer, the term of this patent is extended or adjusted under 35 U.S.C. 154(b) by 0 days. days.

(21) Appl. No.: 14/901,994

(22) PCT Filed: Apr. 23, 2015

(86) PCT No.: PCT/CN2015/077256
§ 371 (c)(1),
(2) Date: Dec. 29, 2015

(87) PCT Pub. No.: WO2016/019740
PCT Pub. Date: Feb. 11, 2016

(65) Prior Publication Data
US 2017/0142598 A1  May 18, 2017

(30) Foreign Application Priority Data
Aug. 8, 2014 (CN) .......................... 2014 1 0391064

(51) Int. Cl.
*H04W 16/26* (2009.01)
*H04L 12/46* (2006.01)
(Continued)

(52) U.S. Cl.
CPC ......... *H04W 16/26* (2013.01); *H04L 12/4633* (2013.01); *H04W 72/042* (2013.01); *H04W 72/0413* (2013.01); *H04W 84/045* (2013.01)

(58) Field of Classification Search
None
See application file for complete search history.

(56) References Cited

U.S. PATENT DOCUMENTS

2007/0116046 A1  5/2007  Liu et al.
2007/0218863 A1* 9/2007  Futatsugi .............. H04L 1/0003
                                                            455/403
(Continued)

FOREIGN PATENT DOCUMENTS

CN      1455531 A    11/2003
CN    103391485 A    11/2013
(Continued)

OTHER PUBLICATIONS

International search report for PCT/CN2015/077256 filed on Apr. 23, 2015.

*Primary Examiner* — Manuel Rangel

(57) ABSTRACT

The invention discloses a small cell base station system, and related devices and data processing methods, and the small cell base station system includes an extended small cell base station and at least one distributed component, where the extended small cell base station includes a network protocol processing module, an upper layer protocol processing module, a physical layer protocol processing module, a first baseband data processing module, and a first transceiver module; and the distributed component includes a second baseband data processing module and a second transceiver module, where in the downlink, the first baseband data processing module separates downlink baseband data into at least two branches, performs a data alignment operation on the at least two branches of downlink baseband data, sends one of the branches to the first transceiver module, and Ethernet encapsulates and then sends the remaining branches to the second transceiver module through the second baseband data processing module of the distributed (Continued)

component, thus extending a coverage area of the small cell base station system.

18 Claims, 13 Drawing Sheets

(51) Int. Cl.
*H04W 72/04* (2009.01)
*H04W 84/04* (2009.01)

(56) References Cited

U.S. PATENT DOCUMENTS

| | | | |
|---|---|---|---|
| 2008/0045226 A1 | 2/2008 | Liu | |
| 2012/0218942 A1* | 8/2012 | Lu | H04W 28/06 370/328 |
| 2013/0077557 A1* | 3/2013 | Chen | H04W 76/022 370/315 |
| 2013/0100948 A1* | 4/2013 | Irvine | H04J 3/0632 370/350 |
| 2014/0016545 A1* | 1/2014 | Jaiswal | H04L 69/22 370/328 |
| 2014/0078966 A1* | 3/2014 | Erceg | H04B 7/0452 370/328 |
| 2014/0112282 A1* | 4/2014 | Wijting | H04L 5/0098 370/329 |
| 2014/0254609 A1* | 9/2014 | Petry | H04L 65/601 370/466 |
| 2014/0369329 A1* | 12/2014 | Lee | H04W 28/06 370/338 |

FOREIGN PATENT DOCUMENTS

| | | |
|---|---|---|
| CN | 104168582 A | 11/2014 |
| WO | WO 2013/122915 A1 | 8/2013 |

* cited by examiner

SMALL CELL BASE STATION SYSTEM, AND RELATED DEVICES AND DATA PROCESSING METHODS

This application is a U.S. National Stage of International Application No. PCT/CN2015/077256, filed on 23 Apr. 2015, designating the United States, which claims priority to Chinese Patent Application No. 201410391064.9, filed with the State Intellectual Property Office of People's Republic of China on Aug. 8, 2014 and entitled "Small cell base station system, and related devices and data processing methods", which are hereby incorporated by reference in their entirety.

FIELD

The present invention relates to the field of communications and particularly to a small cell base station system, and related devices and data processing methods.

BACKGROUND

A small cell base station is a radio access point device with low power consumption, which is primarily characterized by miniaturization of all the radio access components including radio frequency, baseband components, and upper layer protocol processing components, thus providing flexible hotspot coverage and blind area coverage for an operator.

FIG. 1A illustrates a schematic structural diagram of the existing small cell base station including a network protocol processing module 11, an upper layer protocol processing module 12, a physical layer protocol processing module 13, and a transceiver module 14, and FIG. 1B illustrates a data processing method thereof in the downlink including the following steps:

Step 1011: the network protocol processing module 11 receives baseband data from an Internet Protocol (IP) network interconnecting networks, and performs network protocol processing thereon, and then sends to the upper layer protocol processing module 12;

Step 1012: the upper layer protocol processing module 12 performs protocol processing on the received baseband data according to an upper layer protocol (including the L2 data link layer, the L3 network layer, and the Radio Resource Management (RRM) protocol and algorithm), and sends the processed baseband data to the physical layer protocol processing module 13;

Step 1013: the physical layer protocol processing module 13 performs protocol processing on the received baseband data processed under the upper layer protocol, according to the L1 physical layer protocol, and sends to the transceiver module 14; and Step 1014: the transceiver module 14 converts the received baseband data into a radio signal, and sends the radio signal.

At this time the transceiver module 14 enables network coverage to provide a user with a mobile communication service.

FIG. 1C illustrates a data processing method thereof in the uplink including the following steps:

Step 1021: the transceiver module 14 receives a radio frequency signal from a mobile terminal, and converts the radio frequency signal into an uplink baseband data, and then sends to the physical layer protocol processing module 13;

Step 1022: the physical layer protocol processing module 13 receives the uplink baseband data from the transceiver module 14, processes it according to the L1 physical layer protocol, and sends the processed uplink baseband data to the upper layer protocol processing module 12;

Step 1023: the upper layer protocol processing module 12 receives the uplink baseband data from the physical layer protocol processing module 13, and processes it according to the upper layer protocol, and then sends to the network protocol processing module 11; and Step 1024: the network protocol processing module 11 receives the uplink baseband data from the upper layer protocol processing module 12, and processes it according to the network protocol, and then transmits back to a core network over the IP network.

With the small cell base station structured above and the data processing methods thereof, the existing small cell base station enables hotspot coverage and blind area coverage for the operator; however transmit power of the small cell base station is so limited due to a requirement of an indoor application that the transmit power is typically 250 milliwatts (mW) and there is coverage by the single base station. Since the transmit power is low and there are a number of blocking indoor buildings, there may be such a small coverage area that it will be difficult for the existing small cell base station to accommodate applications thereof in scenarios where a large coverage area is required in an enterprise, a public place, etc.

SUMMARY

In view of this, embodiments of the invention provide a small cell base station system, and related devices and data processing methods so as to address such a problem that it will be difficult for the existing small cell base station to accommodate applications thereof in scenarios where a large coverage area is required in an enterprise, a public place, etc.

Embodiments of the invention provide a small cell base station system, and related devices and data processing methods particularly as follows:

A small cell base station system includes an extended small cell base station and at least one distributed component, wherein:

the extended small cell base station is configured to perform network protocol processing, upper layer protocol processing, and physical layer protocol processing sequentially on downlink baseband data received from an Internet Protocol (IP) protocol network interconnecting networks, and then separate the downlink baseband data into at least two branches of downlink baseband data, to perform a first downlink data alignment operation on the at least two branches of downlink baseband data, to convert one of the branches of downlink baseband data into a downlink radio frequency signal and then send the downlink radio frequency signal, and to Ethernet encapsulate and then send the remaining branches of downlink baseband data respectively to the corresponding distributed components through an Ethernet physical layer chip, wherein the first downlink data alignment operation enables the at least two branches of downlink baseband data to be sent concurrently by the extended small cell base station and the corresponding distributed components; and to receive at least one branch of second uplink baseband data through the Ethernet physical layer chip, to Ethernet de-encapsulate the at least one branch of second uplink baseband data, to receive a first uplink radio frequency signal of a user equipment in a coverage area thereof, to convert the first uplink radio frequency signal into first uplink baseband data, to perform a first uplink data alignment operation on the Ethernet de-encapsulated second uplink baseband data and the first uplink baseband data, to perform a vector superimposition operation on the first uplink baseband data, and the second uplink baseband data, on which the first uplink data alignment operation is performed, thus obtaining third uplink baseband data, and to perform physical layer protocol processing, upper layer protocol processing, and network protocol processing sequentially on and then send the third uplink baseband data, wherein the first uplink data alignment operation enables physical layer protocol processing to be performed concurrently on the first uplink baseband data and the second uplink baseband data; and the distributed component is configured to receive the downlink baseband data from the extended small cell base station through the Ethernet physical layer chip, to Ethernet de-encapsulate and convert the downlink baseband data into a downlink radio frequency signal and then send the downlink radio frequency signal; to receive a second uplink radio frequency signal from a user equipment in a coverage area thereof, to convert the second uplink radio frequency signal into second uplink baseband data and then Ethernet encapsulate the second uplink baseband data, and to send the Ethernet encapsulated second uplink baseband data to the extended small cell base station through the Ethernet physical layer chip.

An extended small cell base station includes a network protocol processing module, an upper layer protocol processing module, a physical protocol processing module, a first baseband data processing module, and a first transceiver module, wherein:

the network protocol processing module is configured to perform network protocol conversion processing on downlink baseband data received from an Internet Protocol (IP) protocol network interconnecting networks and then send the downlink baseband data to the upper layer protocol processing module; and to perform network protocol conversion processing on third uplink baseband data on which upper layer protocol processing is performed, and then transmit the third uplink baseband data back to a core network through the IP network;

the upper layer protocol processing module is configured to perform upper layer protocol processing on the received downlink baseband data on which network protocol conversion processing is performed, and then send the downlink baseband data to the physical layer protocol processing module; and to perform upper layer protocol processing on the received third uplink baseband data on which physical layer protocol processing is performed, and then send the third uplink baseband data to the network protocol processing module;

the physical layer protocol processing module is configured to perform physical layer protocol processing on the received downlink baseband data on which uplink protocol processing is performed, and then send the downlink baseband data to the first baseband data processing module; and to perform physical layer protocol processing on the received third uplink baseband data, and then send the third uplink baseband data to the upper layer protocol processing module;

the first baseband data processing module is configured to separate the received downlink baseband data on which physical layer protocol processing is performed, into at least two branches of downlink baseband data, to perform a first downlink data alignment operation on the at least two branches of downlink baseband data, to send one of the branches of downlink baseband data to the first transceiver module, and to Ethernet encapsulate and then send the remaining branches of downlink baseband data respectively to second baseband data processing modules of corresponding distributed components through an Ethernet physical layer chip, wherein the first downlink data alignment operation enables the at least two branches of downlink baseband data to be sent concurrently by the first transceiver module, and second transceiver modules of the corresponding distributed components; and to receive at least one branch of second uplink baseband data through the Ethernet physical layer chip, to Ethernet de-encapsulate the at least one branch of second uplink baseband data, to receive first uplink baseband data from the first transceiver module, to perform a first uplink data alignment operation on the Ethernet de-encapsulated second uplink baseband data and the first uplink baseband data, to perform a vector superimposition operation on the first uplink baseband data, and the second uplink baseband data, on which the first uplink data alignment operation is performed, thus obtaining third uplink baseband data, and to send the third uplink baseband data to the physical layer protocol processing module, wherein the first uplink data alignment operation enables the first uplink baseband data and the second uplink baseband data to be sent concurrently to the physical layer protocol processing module; and the first transceiver module is configured to convert the received downlink baseband data into the downlink radio frequency signal and send the downlink radio frequency signal; to receive a first uplink radio frequency signal from a user equipment in a coverage area thereof, and to convert the first uplink radio frequency signal into the first uplink baseband data, and then send the first uplink baseband data to the first baseband data processing module.

A distributed component includes a second baseband data processing module and a second transceiver module, wherein:

the second baseband data processing module is configured to receive downlink baseband data through an Ethernet physical layer chip, to Ethernet de-encapsulate and then send the downlink baseband data to the second transceiver module; and to Ethernet encapsulate and then send received second uplink baseband data to the first baseband data processing module above through the Ethernet physical layer chip; and the second transceiver module is configured to convert the received downlink baseband data into a downlink radio frequency signal, to send the downlink radio frequency signal; and to receive a second uplink radio frequency signal from a user equipment in a coverage area thereof, to convert the second uplink radio frequency signal into the second uplink baseband data, and to send the second uplink baseband data to the second baseband data processing module.

An intermediary component includes a third baseband data processing module, wherein:

the third baseband data processing module is configured to receive downlink baseband data from the first baseband data processing module above, to Ethernet de-encapsulate the downlink baseband data, to separate the Ethernet de-encapsulated downlink baseband data into at least two branches of downlink baseband data, to perform a second downlink data alignment operation on the at least two branches of downlink baseband data, and to Ethernet encapsulate and then send the at least two branches of downlink baseband data respectively to second baseband data processing modules of corresponding distributed components, where the second downlink data alignment operation enables the at least two branches of downlink baseband data to be sent concurrently by the second transceiver modules of the corresponding distributed components; and to receive at least two branches of second uplink baseband data from the second baseband data processing modules, to Ethernet de-encapsulate the at least two branches of second uplink baseband data respectively, to perform a second uplink data alignment operation and then a vector superimposition operation on the Ethernet de-encapsulated second uplink baseband data to obtain fourth uplink baseband data, and to Ethernet encapsulate and then send the fourth uplink baseband data to the first baseband data processing module, where the second uplink data alignment operation enables the received at least two branches of second uplink baseband data to be sent concurrently to the first baseband data processing module.

A data processing method of the extended small cell base station above includes a downlink data processing method and an uplink data processing method, wherein:

the downlink data processing method includes:

performing, by the network protocol processing module, network protocol conversion processing on downlink baseband data received from an Internet Protocol (IP) network interconnecting networks, and then sending the downlink baseband data to the upper layer protocol processing module;

performing, by the upper layer protocol processing module, upper layer protocol processing on the received downlink baseband data on which network protocol conversion processing is performed, and then sending the downlink baseband data to the physical layer protocol processing module;

performing, by the physical layer protocol processing module, physical layer protocol processing on the received downlink baseband data on which upper layer protocol processing is performed, and then sending the downlink baseband data to a first baseband data processing module;

separating, by the first baseband data processing module, the received downlink baseband data on which physical layer protocol processing is performed, into at least two branches of downlink baseband data, performing a first downlink data alignment operation on the at least two branches of downlink baseband data, sending one of the branches of downlink baseband data to a first transceiver module, and Ethernet encapsulating and then sending the remaining branches of downlink baseband data to corresponding distributed components through an Ethernet physical layer chip; and converting, by the first transceiver module, the received downlink baseband data into a downlink radio frequency signal, and sending the downlink radio frequency signal.

the uplink data processing method includes:

receiving, by the first transceiver module, a first uplink radio frequency signal from a user equipment in a coverage area thereof, and converting the first uplink radio frequency signal into first uplink baseband data, and then sending the first uplink baseband data to a first baseband data processing module;

receiving, by the first baseband data processing module, at least one branch of second uplink baseband data through the Ethernet physical layer chip, Ethernet de-encapsulating the at least one branch of second uplink baseband data, receiving the first uplink baseband data from the first transceiver module, performing a first uplink data alignment operation on the Ethernet de-encapsulated second uplink baseband data, and the first uplink baseband data, performing a vector superimposition operation on the first uplink baseband data, and the second uplink baseband data, on which the first uplink data alignment operation is performed, thus obtaining third uplink baseband data, and sending the third uplink baseband data to the physical layer protocol processing module;

performing, by the physical layer protocol processing module, physical layer protocol processing on and then sending the received third uplink baseband data to the upper layer protocol processing module;

performing, by the upper layer protocol processing module, upper layer protocol processing on the received third uplink baseband data on which physical layer protocol processing is performed, and then sending the third uplink baseband data to the network protocol processing module; and performing, by the network protocol processing module, network protocol processing on the third uplink baseband data on which upper layer protocol processing is performed, and then transmitting the third uplink baseband data back to a core network through the IP network.

In the technical solutions according to the embodiments of the invention, the network-side signal is sent, and the user-side signal is received, by the extended small cell base station, and also the network-side signal is sent, and the user-side signal is received, by the at least one distributed component, to thereby extend the coverage area of the small cell base station system; and the extended small cell base station performs the data alignment and vector superimposition operations on the baseband data from the respective transceivers so that physical layer, upper layer protocol, and network protocol processing is performed centrally by the extended small cell base station, thus extending the coverage area of the small cell base station on one hand, and saving the hardware resources of the system on the other hand.

DETAILED DESCRIPTION OF THE EMBODIMENTS

Figure 1A:
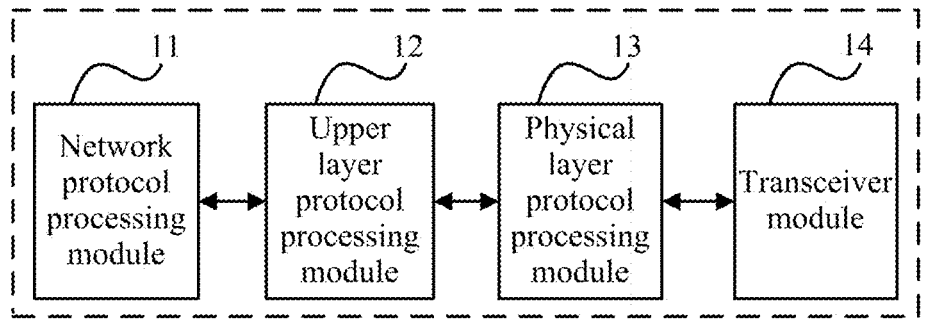
FIG. 1A is a schematic structural diagram of the small cell base station in the prior art to the invention.
Figure 1B:
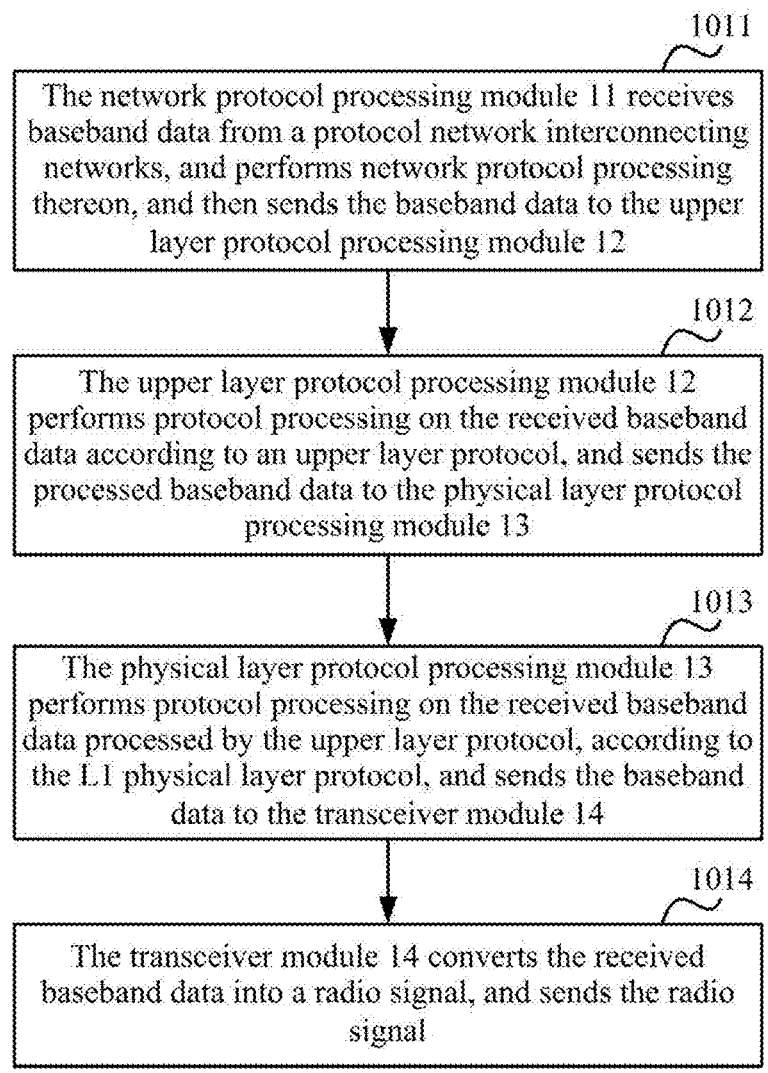
FIG. 1B is a flow chart of a data processing method in the downlink in the prior art to the invention.
Figure 1C:
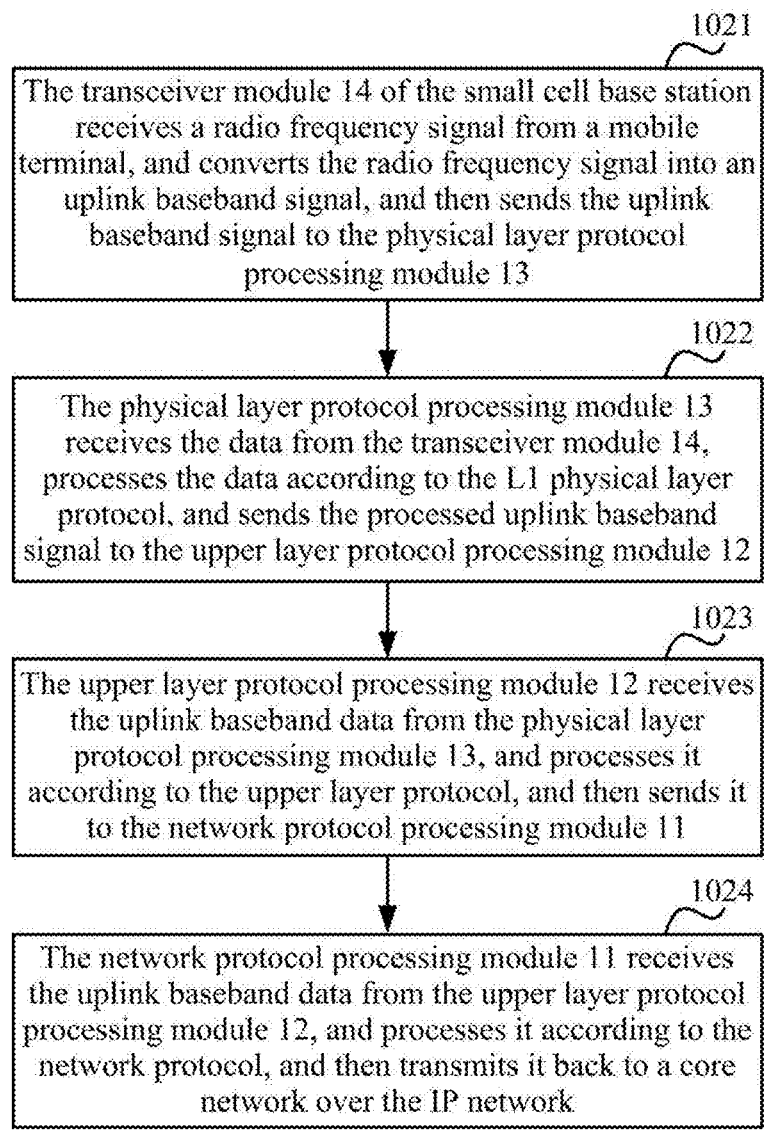
FIG. 1C is a flow chart of a data processing method in the uplink in the prior art to the invention.

In order to address the problem above in the prior art, embodiments of the invention provide a small cell base station system, and related devices and data processing methods.

In the solution according to embodiments of the invention, the small cell base station system includes an extended small cell base station, and a distributed component of at least one small cell base station. In the downlink, the extended small cell base station receives downlink baseband data from an IP network, and performs baseband operation processing including a downlink data alignment operation on the downlink baseband data, and then distributes a branch thereof to a local transceiver module, and further Ethernet encapsulates the remaining branch of the downlink baseband data, and sends the remaining branch of the downlink baseband data to the corresponding distributed component over a network link or an optic fiber, and the distributed component Ethernet de-encapsulates the received downlink baseband data, and then sends it to a transceiver module thereof, and the transceiver module of the extended small cell base station, and the respective distributed components send concurrently their downlink radio frequency signals into which the received downlink baseband data is converted, according to the downlink data alignment operation; and in the uplink, a first transceiver module of the extended small cell base station receives and converts a first uplink radio frequency signal from a user in a coverage area thereof into first uplink baseband data, second transceiver modules of the distributed components receive and convert second uplink radio frequency signals sent by users in their coverage areas into second uplink baseband data, second baseband data processing modules of the distributed components Ethernet encapsulate the second uplink baseband data, and then send them to a first baseband data processing module of the extended small cell base station over network lines or optical fibers, and the first baseband data processing module Ethernet de-encapsulates the second uplink baseband data, and then performs uplink data alignment and vector superimposition operations on the de-encapsulated second uplink baseband data and the first uplink baseband data to obtain third uplink baseband data, and also sends it to a physical layer protocol processing module for corresponding protocol processing. The network-side signal is sent, and the user-side signal is received, by the extended small cell base station, and also the network-side signal is sent, and the user-side signal is received, by the at least one distributed component, to thereby extend the coverage area of the small cell base station system, and also the extended small cell base station performs the data alignment and vector superimposition operations on the respective uplink baseband data so that physical layer, upper layer protocol, and network protocol processing is performed centrally by the extended small cell base station, and the respective uplink baseband data is transmitted back by the extended small cell base station to a core network, to thereby save hardware sources of the system.

The embodiments of the invention will be described below in details with reference to the drawings.

First Embodiment

Figure 2:
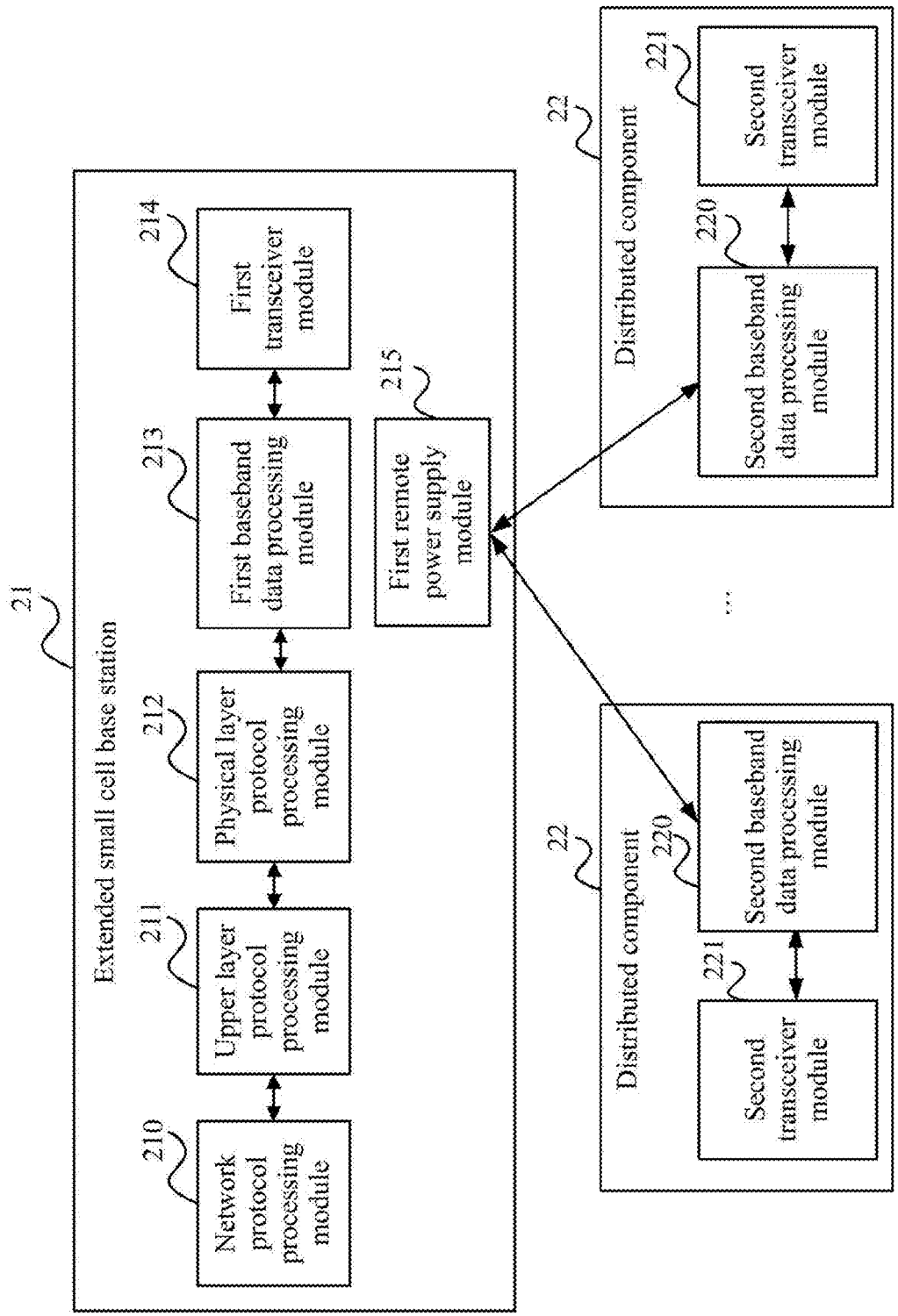
FIG. 2 is a schematic structural diagram of a small cell base station system according to the first embodiment of the invention.

The first embodiment of the invention provides a small cell base station system, and FIG. 2 illustrates a schematic structural diagram thereof including an extended small cell base station 21 and at least one distributed component 22;

The extended small cell base station 21 is configured to perform network protocol processing, upper layer protocol processing, and physical layer protocol processing sequentially on downlink baseband data received from an Internet Protocol (IP) protocol network interconnecting networks, and then separate the downlink baseband data into at least two branches of downlink baseband data, to perform a first downlink data alignment operation on the at least two branches of downlink baseband data, to convert one of the branches of downlink baseband data into a downlink radio frequency signal and then send the downlink radio frequency signal, and to Ethernet encapsulate and then send the remaining branches of downlink baseband data respectively to the corresponding distributed components through an Ethernet physical layer chip, where the first downlink data alignment operation enables the at least two branches of downlink baseband data to be sent concurrently by the extended small cell base station and the corresponding distributed components; and to receive at least one branch of second uplink baseband data through the Ethernet physical layer chip, to Ethernet de-encapsulate the at least one branch of second uplink baseband data; to receive a first uplink radio frequency signal of a user equipment in a coverage area thereof, to convert the first uplink radio frequency signal into first uplink baseband data, to perform a first uplink data alignment operation on the Ethernet de-encapsulated second uplink baseband data and the first uplink baseband data, to perform a vector superimposition operation on the first uplink baseband data, and the second uplink baseband data, on which the first uplink data alignment operation is performed, thus obtaining third uplink baseband data, and to perform physical layer protocol processing, upper layer protocol processing, and network protocol processing sequentially on and then send the third uplink baseband data, where the first uplink data alignment operation enables physical layer protocol processing to be performed concurrently on the first uplink baseband data and the second uplink baseband data; and The distributed component 22 is configured to receive the downlink baseband data from the extended small cell base station through the Ethernet physical layer chip, to Ethernet de-encapsulate the downlink baseband data into a downlink radio frequency signal and then send the downlink radio frequency signal; to receive a second uplink radio frequency signal from a user equipment in a coverage area thereof, to convert the second uplink radio frequency signal into second uplink baseband data and then Ethernet encapsulate the second uplink baseband data, and to send the Ethernet encapsulated second uplink baseband data to the extended small cell base station through the Ethernet physical layer chip.

Preferably the extended small cell base station includes a network protocol processing module 210, an upper layer protocol processing module 211, a physical layer protocol processing module 212, a first baseband data processing module 213, and a first transceiver module 214, where:

The network protocol processing module 210 is configured to perform network protocol conversion processing on the downlink baseband data received from the Internet Protocol (IP) protocol network interconnecting the networks and then send the downlink baseband data to the upper layer protocol processing module 211; and to perform network protocol conversion processing on the third uplink baseband data on which upper layer protocol processing is performed, and then transmit the third uplink baseband data back to a core network through the IP network;

The upper layer protocol processing module 211 is configured to perform upper layer protocol processing on the received downlink baseband data on which network protocol conversion processing is performed, and then send the downlink baseband data to the physical layer protocol processing module 212; and to perform upper layer protocol processing on the received third uplink baseband data on which physical layer protocol processing is performed, and then send the third uplink baseband data to the network protocol processing module 210;

The physical layer protocol processing module 212 is configured to perform physical layer protocol processing on the received downlink baseband data on which uplink protocol processing is performed, and then send the downlink baseband data to the first baseband data processing module 213; and to perform physical layer protocol processing on the received third uplink baseband data, and then send the third uplink baseband data to the upper layer protocol processing module 211;

The first baseband data processing module 213 is configured to separate the received downlink baseband data on which physical layer protocol processing is performed, into the at least two branches of downlink baseband data, to perform the first downlink data alignment operation on the at least two branches of downlink baseband data, to send the one of branches of downlink baseband data to the first transceiver module, and to Ethernet encapsulate and then send the remaining branches of downlink baseband data respectively to the corresponding distributed components through the Ethernet physical layer chip; and to receive the at least one branch of the second uplink baseband data through the Ethernet physical layer chip, to Ethernet de-encapsulate the at least one branch of second uplink baseband data, to receive the first uplink baseband data from the first transceiver module, to perform the first uplink data alignment operation on the Ethernet de-encapsulated second uplink baseband data and the first uplink baseband data, to perform the vector superimposition operation on the first uplink baseband data, and the second uplink baseband data, on which the first uplink data alignment operation is performed, thus obtaining the third uplink baseband data, and to send the third uplink baseband data to the physical layer protocol processing module; and The first transceiver module 214 is configured to convert the received downlink baseband data into the downlink radio frequency signal and then send the downlink radio frequency signal; to receive the first uplink radio frequency signal from the user equipment in the coverage area thereof, and to convert the first uplink radio frequency signal into the first uplink baseband data, and then send the first uplink baseband data to the first baseband data processing module.

Preferably the distributed component includes a second baseband data processing module 220 and a second transceiver module 221, where:

The second baseband data processing module 220 is configured to receive the downlink baseband data from the extended small cell base station through the Ethernet physical layer chip, to Ethernet de-encapsulate and then send the downlink baseband data to the second transceiver module; and to Ethernet encapsulate and then send the received second uplink baseband data to the extended small cell base station through the Ethernet physical layer chip; and The second transceiver module 221 is configured to convert the received downlink baseband data into the downlink radio frequency signal; and then send the downlink radio frequency signal, to receive the second uplink radio frequency signal from the user equipment in the coverage area thereof, to convert the second uplink radio frequency signal into the second uplink baseband data, and then send the second uplink baseband data to the second baseband data processing module 220.

Preferably the extended small cell base station further includes a first remote power supply module 215 configured to feed an electric signal into a network line, and to transmit the electric signal and the downlink baseband data concurrently to the second baseband data processing module 220 and the second transceiver module 221 in the distributed component;

Here the first downlink data alignment operation can be performed particularly as follows or, of course, can be performed otherwise:

The first baseband data processing module sends all of the at least two branches of downlink baseband data at an advance of a preset period of time, instructs the first transceiver module to convert the received downlink baseband data into the downlink radio frequency signal, to send the downlink radio frequency signal at a delay which is a difference between the preset period of time and a first measurement transmission delay, to instruct the second transceiver module to convert the received downlink baseband data into the downlink radio frequency signal, and to send the downlink radio frequency signal by a difference between the preset period of time and a second measurement transmission delay, where the first measurement transmission delay can be a transmission delay at which the downlink baseband data measured by the extended small cell base station is transmitted from the first baseband data processing module to the first transceiver module; the second measurement transmission delay can be a transmission delay at which the downlink baseband data, measured by the distributed component where the second transceiver module is located, is transmitted from the first baseband data processing module to the second transceiver module; and a length of the preset period of time is more than or equal to the largest one of respective second measurement transmission delays; and The respective distributed components send the downlink radio frequency signals at their measured second measurement transmission delays.

The first downlink data alignment operation can be performed particularly as follows or, of course, can be performed otherwise:

Headers of a local first uplink baseband data frame and a second uplink baseband data frame from the distributed component are temporally aligned referring to a stored local reference frame.

Figure 3:
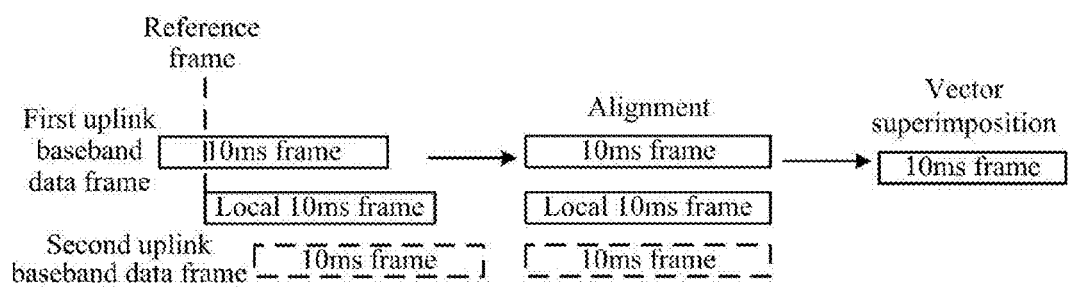
FIG. 3 is a schematic diagram of a data alignment operation and a vector superimposition operation according to the first embodiment of the invention.

For example, FIG. 3 illustrates a flow in which headers of a local first uplink baseband data frame (a 10 ms data frame)

and a second uplink baseband data frame (a 10 ms data frame) from the distributed component are temporally aligned referring to a local reference frame of 10 ms, and the aligned uplink baseband data frames are vector superimposed.

With the solution according to the first embodiment of the invention, on one hand, the coverage area of the small cell base station system is extended, and on the other hand, the hardware resources of the system are saved. Further to the solution according to the first embodiment of the invention, the small cell base station system can further include at least one intermediary component connected with the extended small cell base station and the at least one distributed component to enhance the extensibility of the extended small cell base station, and this preferred solution will be described below in a solution according to the second embodiment of the invention.

Second Embodiment

Figure 4:
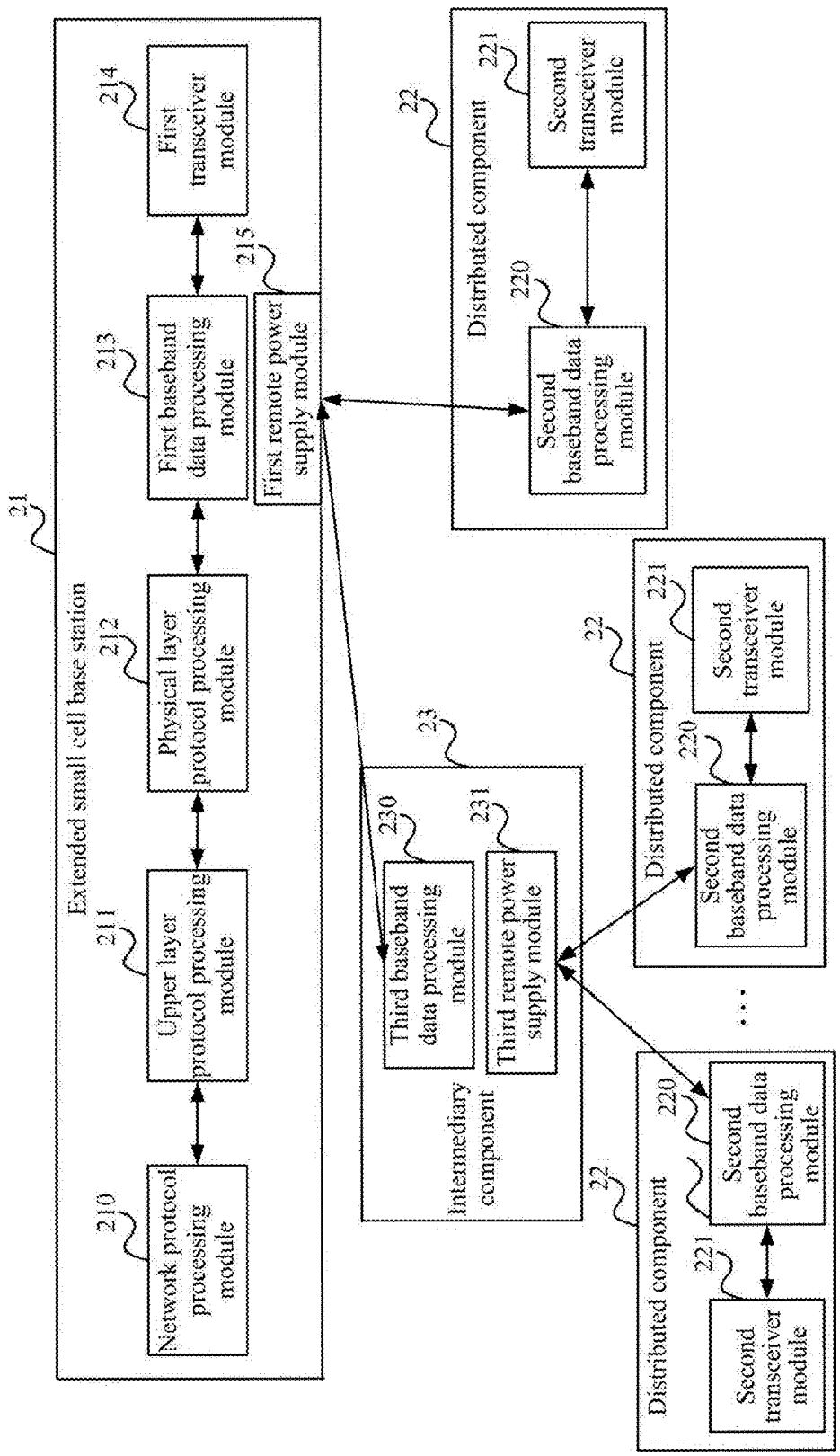
FIG. 4 is a schematic structural diagram of a small cell base station system according to the second embodiment of the invention.

The second embodiment of the invention provides a small cell base station system, and FIG. 4 illustrates a schematic structural diagram including the small cell base station 21, at least one intermediary component 23 and the at least one distributed component 22, where:

The extended small cell base station 21 is further configured to Ethernet encapsulate and then send the remaining branches of downlink baseband data respectively to the corresponding distributed components through the Ethernet physical layer chip; and to receive fourth uplink baseband data from the intermediary component through the Ethernet physical layer chip, to Ethernet de-encapsulate the fourth uplink baseband data, to perform a third uplink data alignment operation on the Ethernet de-encapsulated fourth uplink baseband data, second uplink baseband data and first uplink baseband data, to perform the vector superimposition operation on the first uplink baseband data and the second uplink baseband data, on which the first uplink data alignment operation is performed, and the fourth uplink baseband data to obtain fifth uplink baseband data, and to send the fifth uplink baseband data to the physical layer protocol processing module, where the third uplink data alignment operation enables physical layer protocol processing concurrently to be performed on the first uplink baseband data, the second uplink baseband data and the fourth uplink baseband data;

The intermediary component 23 is configured to receive the downlink baseband data from the extended small cell base station, to Ethernet de-encapsulate the downlink baseband data, to separate the Ethernet de-encapsulated downlink baseband data into the at least two branches of downlink baseband data, to perform a second downlink data alignment operation on the at least two branches of downlink baseband data, and to Ethernet encapsulate and then send the at least two branches of downlink baseband data respectively to the corresponding distributed components, where the second downlink data alignment operation enables the at least two branches of downlink baseband data to be sent concurrently by the corresponding distributed components; and to receive at least two branches of second uplink baseband data from the distributed components, to Ethernet de-encapsulate the at least two branches of second uplink baseband data respectively, to perform a second uplink data alignment operation and then a vector superimposition operation on the Ethernet de-encapsulated second uplink baseband data to obtain fourth uplink baseband data, and to Ethernet encapsulate and then send the fourth uplink baseband data to the extended small cell base station, where the second uplink data alignment operation enables the received at least two branches of second uplink baseband data to be sent concurrently to the extended small cell base station; and The distributed component 22 is further configured to receive the downlink baseband data from the intermediary component, to Ethernet de-encapsulate and then convert the downlink baseband data into the downlink radio frequency signal, to send the downlink radio frequency signal; and to send the Ethernet de-encapsulated second uplink baseband data to the intermediary component through the Ethernet physical layer chip.

Here the intermediary component 23 includes a third baseband data processing module 230.

Functions of respective components in the extended small cell base station 21, the at least one intermediary component 23 and the at least one distributed component 22 in the system according to this second embodiment will be described below.

At this time the functions of a network protocol processing module 210, an upper layer protocol processing module 211, a physical layer protocol processing module 212 and a first transceiver module 214 included in the extended small cell base station 21 are the same as those in the first embodiment, so a repeated description thereof will be omitted here, functions of a first baseband data processing module 213 and the second baseband data processing module will not be totally the same as those in the first embodiment, and will be described below:

The first baseband data processing module 213 is configured to separate the received downlink baseband data on which physical layer protocol processing is performed, into the at least two branches of downlink baseband data, to perform the first downlink data alignment operation on the at least two branches of downlink baseband data, to send the one of branches of downlink baseband data to the first transceiver module 214, and to Ethernet encapsulate and then send the remaining branches of downlink baseband data respectively to the corresponding second transceiver modules 221, or the third baseband data processing modules 230 of the corresponding intermediary components through the Ethernet physical layer chip, where the first downlink data alignment operation enables the at least two branches of downlink baseband data to be sent concurrently by the first transceiver module 214 and the corresponding second transceiver module 221; and to receive the fourth uplink baseband data from the third baseband data processing modules through the Ethernet physical layer chip, to Ethernet de-encapsulate the fourth uplink baseband data, to receive the at least one branch of second uplink baseband data through the Ethernet physical layer chip, to Ethernet de-encapsulate the at least one branch of second uplink baseband data, to receive the first uplink baseband data from the first transceiver module, to perform the third uplink data alignment operation on the Ethernet de-encapsulated fourth uplink baseband data, the second uplink baseband data, and the first uplink baseband data, to perform the vector superimposition operation on the first uplink baseband data, the second uplink baseband data, and the fourth uplink baseband data, on which the first uplink data alignment operation is performed to obtain fifth uplink baseband data, and to send the fifth uplink baseband data to the physical layer protocol processing module, where the third uplink data alignment operation enables the first uplink baseband data, the second uplink baseband data and the fourth uplink baseband data to be sent concurrently to the physical layer protocol processing module; and The corresponding second transceiver module above refers to the second transceiver module of the distributed component connected directly with the extended small cell base station;

The first uplink data alignment operation in the second embodiment of the invention is similar to that in the first embodiment, but the local first transceiver module for the first baseband data processing module here, and the transceiver component of the distributed component, and the intermediary component, both of which are connected directly therewith are not for the distributed component connected directly with the intermediary component, and the first baseband data processing module sends all of the at least two branches of downlink baseband data at an advance of a preset period of time, instructs the first transceiver module to convert the received downlink baseband data into the downlink radio frequency signal, and then send the downlink radio frequency signal at a delay which is a difference between the preset period of time and a first measurement transmission delay, to instruct the second transceiver module of the distributed component connected directly therewith to convert the received downlink baseband data into the downlink radio frequency signal, and then send the downlink radio frequency signal by a difference between the preset period of time and a second measurement transmission delay, and to instruct the intermediary component to process the received downlink baseband data and enable the second transceiver module and the first transceiver module, both of which are connected therewith to convert the received downlink baseband data into the downlink frequency signals, and then send the downlink radio frequency signals concurrently;

The third baseband data processing module 230 is configured to receive the downlink baseband data from the first baseband data processing module 213, to Ethernet de-encapsulate the downlink baseband data, to separate the Ethernet de-encapsulated downlink baseband data into the at least two branches of downlink baseband data, to perform the second downlink data alignment operation on the at least two branches of downlink baseband data, and to Ethernet encapsulate and then send the at least two branches of downlink baseband data respectively to the second transceiver modules 220 of the corresponding distributed components, where the second downlink data alignment operation enables the at least two branches of downlink baseband data to be sent concurrently by the second transceiver modules of the corresponding distributed components; and to receive the at least two branches of second uplink baseband data from the second baseband data processing modules, to Ethernet de-encapsulate the at least two branches of second uplink baseband data respectively, to perform the second uplink data alignment operation and then the vector superimposition operation on the Ethernet de-encapsulated second uplink baseband data to obtain the fourth uplink baseband data, and to Ethernet encapsulate and then send the fourth uplink baseband data to the first baseband data processing module, where the second uplink data alignment operation enables the received at least two branches of second uplink baseband data to be sent concurrently to the first baseband data processing module 213;

The second uplink data alignment operation, the third uplink data alignment operation, and the second downlink data alignment operation are particularly performed similarly to those in the first embodiment, so a repeated description thereof will be omitted here; and The second baseband data processing module 220 is further configured to receive the downlink baseband data from the third baseband data processing module, to Ethernet de-encapsulate and then send the downlink baseband data to the second transceiver module, and to Ethernet encapsulate and then send the received second uplink baseband data to the third baseband data processing module through the Ethernet physical layer chip.

Preferably the intermediary component further includes a third remote power supply module 231 configured to feed an electric signal into a network line or an optic fiber, and to transmit the electric signal and the downlink baseband data concurrently to the distributed component connected therewith.

In the solution according to the second embodiment of the invention, the intermediary component is further added, and the intermediary component can be connected with a number of distributed components of the small cell base station to thereby enhance the extensibility of the extended small cell base station.

Third Embodiment

Figure 5:
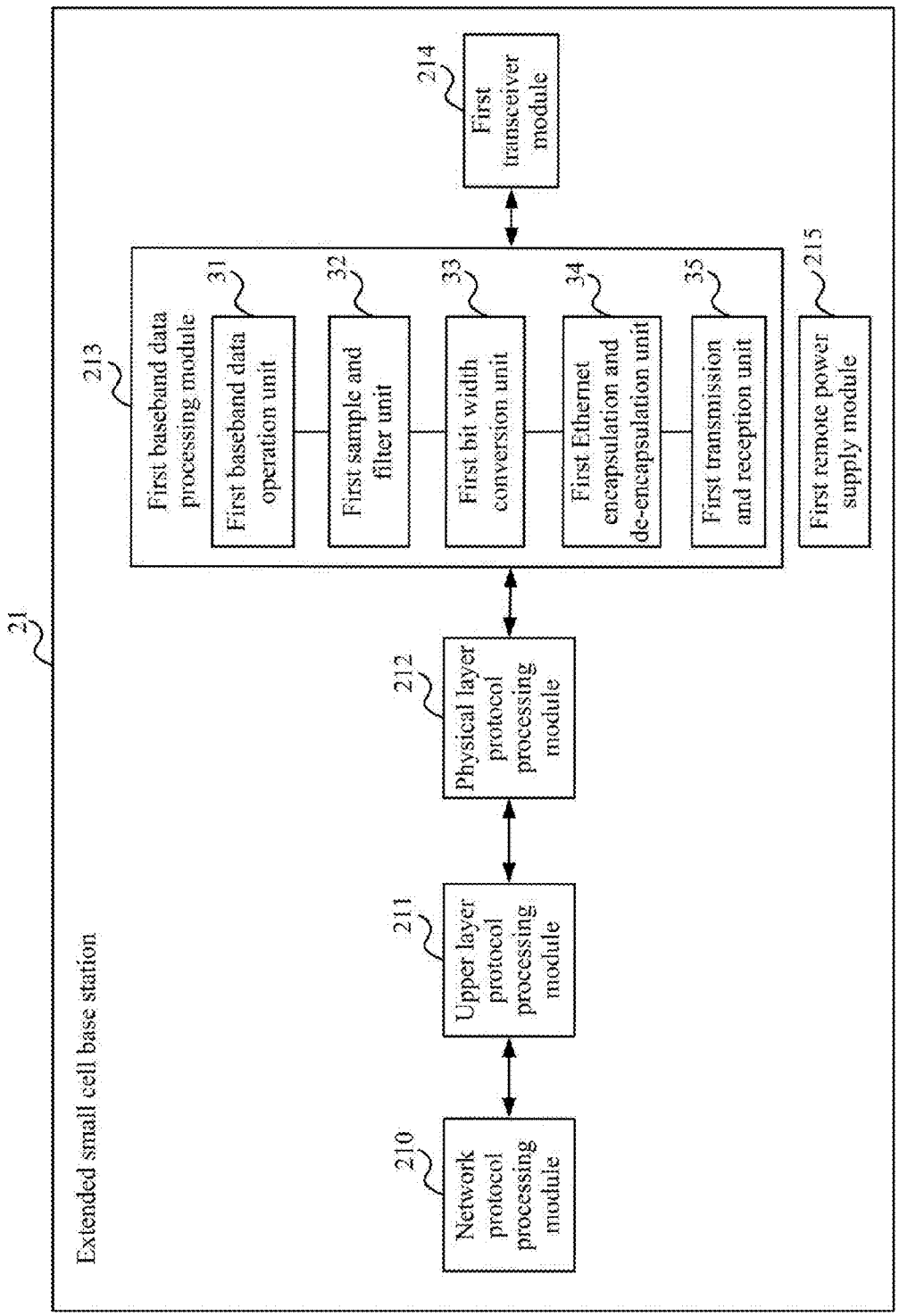
FIG. 5 is a schematic structural diagram of an extended small cell base station according to the third embodiment of the invention.

The third embodiment of the invention provides an extended small cell base station, and FIG. 5 illustrates a schematic structural diagram thereof including: a network protocol processing module 210, an upper layer protocol processing module 211, a physical protocol processing module 212, a first baseband data processing module 213, and a first transceiver module 214, where:

The network protocol processing module 210 is configured to perform network protocol conversion processing on downlink baseband data received from an Internet Protocol (IP) protocol network interconnecting networks and then send the downlink baseband data to the upper layer protocol processing module, and to perform network protocol conversion processing on third uplink baseband data on which upper layer protocol processing is performed, and then transmit the third uplink baseband data back to a core network through the IP network;

The upper layer protocol processing module 211 is configured to perform upper layer protocol processing on the received downlink baseband data on which network protocol conversion processing is performed, and then send the downlink baseband data to the physical layer protocol processing module; and to perform upper layer protocol processing on the received third uplink baseband data on which physical layer protocol processing is performed, and then send the third uplink baseband data to the network protocol processing module;

The physical layer protocol processing module 212 is configured to perform physical layer protocol processing on the received downlink baseband data on which uplink protocol processing is performed, and then send the downlink baseband data to the first baseband data processing module; and to perform physical layer protocol processing on the received third uplink baseband data, and then send the third uplink baseband data to the upper layer protocol processing module;

The first baseband data processing module 213 is configured to separate the received downlink baseband data on which physical layer protocol processing is performed, into at least two branches of downlink baseband data, to perform a first downlink data alignment operation on the at least two branches of downlink baseband data, to send one of the branches of downlink baseband data to the first transceiver module, and to Ethernet encapsulate and then send the remaining branches of downlink baseband data respectively to second baseband data processing modules of corresponding distributed components through an Ethernet physical layer chip, where the first downlink data alignment operation enables the at least two branches of downlink baseband data to be sent concurrently by the first transceiver module, and second transceiver modules of the corresponding distributed components; and to receive at least one branch of second uplink baseband data through the Ethernet physical layer chip, to Ethernet de-encapsulate the at least one branch of second uplink baseband data, to receive first uplink baseband data from the first transceiver module, to perform a first uplink data alignment operation on the Ethernet de-encapsulated second uplink baseband data and the first uplink baseband data, to perform a vector superimposition operation on the first uplink baseband data, and the second uplink baseband data, on which the first uplink data alignment operation is performed, thus obtaining third uplink baseband data, and to send the third uplink baseband data to the physical layer protocol processing module, where the first uplink data alignment operation enables the first uplink baseband data and the second uplink baseband data to be sent concurrently to the physical layer protocol processing module; and The first transceiver module 214 is configured to convert the received downlink baseband data into the downlink radio frequency signal and then send the downlink radio frequency signal; to receive a first uplink radio frequency signal from a user equipment in a coverage area thereof, and to convert the first uplink radio frequency signal into the first uplink baseband data, and then send the first uplink baseband data to the first baseband data processing module.

Preferably the first baseband data processing module 213 is further configured to Ethernet encapsulate and then send the remaining branches of downlink baseband data respectively to third baseband data processing modules of corresponding intermediary components through the Ethernet physical layer chip; and to receive fourth uplink baseband data from the third baseband data processing modules through the Ethernet physical layer chip, to Ethernet de-encapsulate the fourth uplink baseband data, to perform a third uplink data alignment operation on the Ethernet de-encapsulated fourth uplink baseband data, second uplink baseband data and first uplink baseband data, to perform a vector superimposition operation on the first uplink baseband data and the second uplink baseband data, on which the first uplink data alignment operation is performed, and the fourth uplink baseband data to obtain fifth uplink baseband data, and to send the fifth uplink baseband data to the physical layer protocol processing module, where the third uplink data alignment operation enables the first uplink baseband data, the second uplink baseband data and the fourth uplink baseband data to be sent concurrently to the physical layer protocol processing module.

Preferably the first baseband data processing module 213 includes a first baseband data operation unit 31, a first sample and filter unit 32, a first bit width conversion unit 33, a first Ethernet encapsulation and de-encapsulation unit 34, and a first transmission and reception unit 35, where:

The first baseband data operation unit 31 is configured to separate the received downlink baseband data on which physical layer protocol processing is performed, into the at least two branches of downlink baseband data, to perform the first downlink data alignment operation on the at least two branches of downlink baseband data, to send the one of branches of downlink baseband data to the first transceiver module, to send the remaining branches of downlink baseband data to the first sample and filter unit; to receive the first uplink baseband data from the first transceiver module, to perform the first uplink data alignment operation on the first uplink baseband data, and the uplink sampled and filtered second uplink baseband data, to perform the vector superimposition operation on the first uplink baseband data, and the second uplink baseband data, on which the first uplink data alignment operation is performed, thus obtaining the third uplink baseband data, and to send the third uplink baseband data to the physical layer protocol processing module thereof;

The first sample and filter unit 32 is configured to downlink sample and filter, and then send each of the received branches of downlink baseband data to the first bit width conversion unit; and to uplink sample and filter, and then send the received bit width converted second uplink baseband data to the first baseband data operation unit;

The first bit width conversion unit 33 is configured to bit width convert the received downlink sampled and filtered downlink baseband data into the downlink baseband data suitable for Ethernet transmission, to write the downlink baseband data into a first memory, to read from the first memory and bit width convert each of the Ethernet de-encapsulated branches of second uplink baseband data into the second uplink baseband data suitable for processing by the first sample and filter unit, and to send the bit width converted second uplink baseband data to the first sample and filter unit;

The first Ethernet encapsulation and de-encapsulation unit 34 is configured to read and Ethernet encapsulate, and then send the bit width converted downlink baseband data in the first memory to the first transmission and reception unit; and to Ethernet de-encapsulate and then write the at least one received branch of second uplink baseband data into the first memory; and The first transmission and reception unit 35 is configured to send the received Ethernet encapsulated downlink baseband data to the corresponding second transceiver modules through the Ethernet physical layer chip; and to receive and send the at least one branch of second uplink baseband data to the first Ethernet encapsulation and de-encapsulation unit through the Ethernet physical layer chip.

Preferably separating the received downlink baseband data on which physical layer protocol processing is performed, into the at least two branches of downlink baseband data includes:

If the received downlink baseband data on which physical layer protocol processing is performed is the same, then duplicating the downlink baseband data on which physical layer protocol processing is performed, into the at least two branches of downlink baseband data; and If the received downlink baseband data on which physical layer protocol processing is performed is not the same, then separating the downlink baseband data on which physical layer protocol processing is performed, into the at least two different branches of downlink baseband data.

Whether the baseband data is the same or not can be determined in advance, that is, this will be configured before the device is started into operation, where it is defaulted as a pattern where the baseband data is the same.

If the received downlink baseband data on which physical layer protocol processing is performed is not the same, then equivalently a transmission signal of each coverage end may be different from that of one another, and each distributed component can provide separate signal coverage, so that equivalently there are a number of cells, thus resulting in coverage of an extended capacity; and if the received downlink baseband data on which physical layer protocol processing is performed is the same, then equivalently the data will be broadcasted, and the transmission signals of the respective distributed components will be the same, thus resulting in coverage of an extended capacity.

Preferably the extended small cell base station further includes a first remote power supply module 215 configured to feed an electric signal into a network line or an optical fiber, and to transmit the electric signal and the downlink baseband data concurrently to the distributed component.

As for the first baseband data processing module 213 illustrated in FIG. 6, a flow in which the first baseband data processing module 213 processes the downlink baseband data received from the physical layer protocol processing module 212, and a flow in which it processes the second uplink baseband data received from the second baseband data processing module will be described below by way of a particular example.

Figure 6:
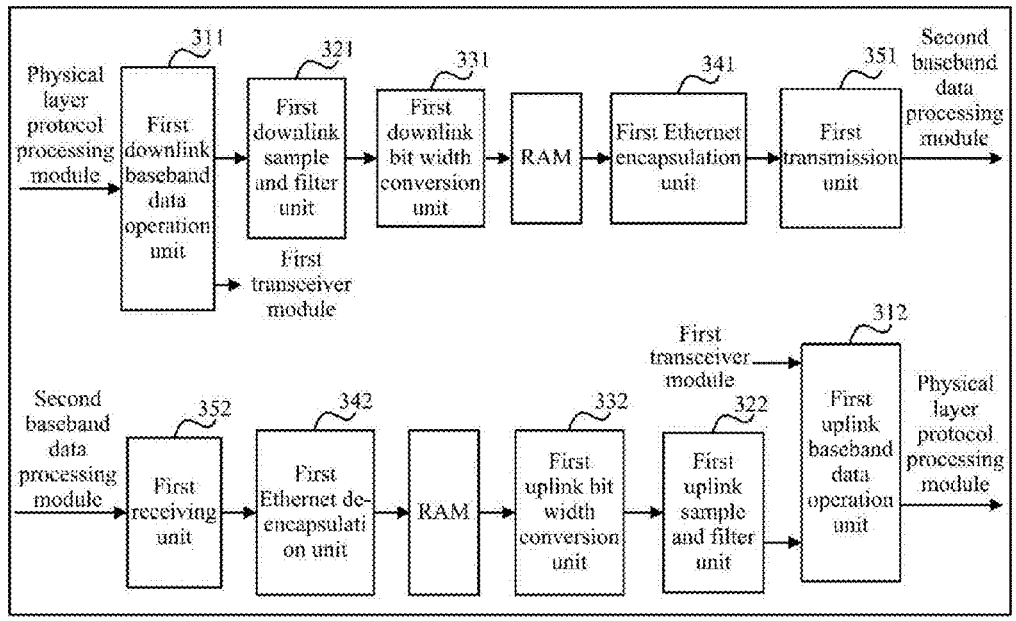
FIG. 6 is a schematic structural diagram of a first baseband data processing module according to the third embodiment of the invention.
Figure 7:
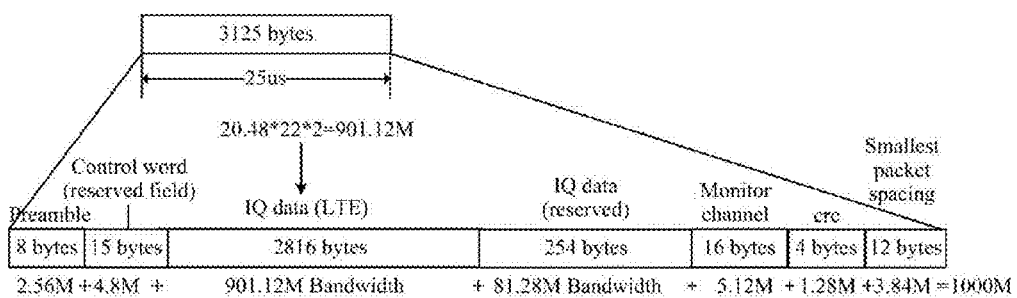
FIG. 7 is a schematic diagram of a format of a network transmission frame according to the third embodiment of the invention.

In order to clearly illustrate the flows in which the first baseband data processing module processes the baseband data in the uplink and the downlink, all the first baseband data operation unit 31, the first sample and filter unit 32, the first bit width conversion unit 33, the first Ethernet encapsulation and de-encapsulation unit 34, and the first transmission and reception unit 35 are functionally distinguished in the uplink from the downlink in FIG. 6; and in FIG. 6, there are a first downlink baseband data operation unit 311, a first downlink sample and filter unit 321, a first downlink bit width conversion unit 331, a first Ethernet encapsulation unit 341, and a first transmission unit 351 in the downlink; and there are a first reception unit 352, a first Ethernet de-encapsulation unit 342, a first uplink bit width conversion unit 332, a first uplink sample and filter unit 322, and a first uplink baseband data operation unit 312 in the uplink;

Stated otherwise, in FIG. 6, the first downlink baseband data operation unit 311 and the first uplink baseband data operation unit 312 constitute the first baseband data operation unit 31, the first downlink sample and filter unit 321 and the first uplink sample and filter unit 322 constitute the first sample and filter unit 32, the first downlink bit width conversion unit 331 and the first uplink bit width conversion unit 332 constitute the first bit width conversion unit 33, the first Ethernet encapsulation unit 341 and the first Ethernet de-encapsulation unit 342 constitute the first Ethernet encapsulation and de-encapsulation unit 34, and the first transmission unit 351 and the first reception unit 352 constitute the first transmission and reception unit 35;

The first baseband data processing module 213 processes the downlink baseband data received from the physical protocol processing module 212 as follows:

The first downlink baseband data operation unit 311 receives an LTE carrier with a data clock of 122.88 MHz, a data bit width of 16 bits, and a baseband rate of 30.72 Mbps from the physical protocol processing module, performs a baseband data operation on the downlink baseband data carried over the carrier, separates the downlink baseband data into two branches, performs the first downlink data alignment operation on the local downlink baseband data, and the downlink baseband data of the distributed component referring to the local 10 ms data frame, and distributes one of the branches directly to the local first transceiver module 214 and the other branch to the first downlink sample and filter unit 321;

The first downlink sample and filter unit 321 samples and filters the received downlink baseband data, down-convert the rate of the baseband data from 30.72 Mbps to 20.48 Mbps, and converts the bit width of the data from original 16 bits to 11 bits;

The first downlink bit width conversion unit 331 performs bit width conversion on the filtered downlink baseband data, where in order to facilitate transmission of an Ethernet packet, the bit width of the data needs to be converted so that the bit width of the data is converted from 11 bits to 8 bits, and then the first downlink bit width conversion unit 331 buffers the bit width converted data in an asynchronous Random Access Memory (RAM), and also provides a frame header indicator, and an indicator that the data can be sent;

The first Ethernet encapsulation unit 341 reads the baseband data in the asynchronous RAM, and encapsulates it by taking an LTE frame (20.48 Mbps) of 10 ms as a boundary, where there are 1, 126, 400 bytes in each 10 ms frame, and encapsulating these bytes into 400 packets for transmission, where 2, 816 bytes of LTE data are transmitted in each Ethernet packet, and FIG. 7 illustrates a network transmission frame format as a result of encapsulation, where the network transmission frame format complies with a customized baseband transmission protocol between the first baseband data processing module, and the second baseband data processing module of the distributed component, or, of course, it will not be limited to the format illustrated in FIG. 7;

In FIG. 7, the customized frame has a length of 25 µs, can include 3, 125 bytes of data, and occupies a bandwidth of 1000 Mbps, and the network transmission frame includes seven fields: a preamble includes eight bytes and occupies a bandwidth of 2.56 Mbps; a control word (a reserved field for timing and delay revision) include 15 bytes and occupies a bandwidth of 4.8 Mbps; IQ data (LTE) includes 2, 816 bytes and occupies a bandwidth of 901.12 Mbps; IQ data (reserved) includes 254 bytes and occupies a bandwidth of 81.28 Mbps; a monitor channel includes 16 bytes and occupies a bandwidth of 5.12 Mbps; a Cyclic Redundancy Check (CRC) includes four bytes and occupies a bandwidth of 1.28 Mbps; and a smallest packet spacing includes 12 bytes and occupies a bandwidth of 3.84 Mbps, where the sampling rate of 20.48 Mbps is multiplied by the bit width 22 of the IQ data and then the number 2 of Multiple Input Multiple Output (MIMO) branches, thus resulting in 901.12 Mbps; and The first transmission unit 351 receives the data framed by the first Ethernet framing module, the frame header indicator, and the indicator that the data can be sent, outputs the Ethernet data at the timing of an Ethernet interface, and sends it through the Ethernet physical layer chip.

The second uplink baseband data received from the second baseband data processing module is processed as follows:

The first reception unit 352 receives the second uplink baseband data from the second baseband data processing module;

The first Ethernet de-encapsulation unit 342 extracts the 10 ms frame header information and a synchronization indicator according to a frame number field of control bytes in the Ethernet data frame, takes out the IQ data encapsulated in the Ethernet data frame, and stores the IQ data in the RAM;

The first uplink bit width conversion unit 332 reads the IQ data in the asynchronous RAM according to the frame header information and a synchronization indicator, and performs bit width conversion on the data;

The first uplink sample and filter unit 322 samples and filters the bit width converted second uplink baseband data, and converts the second uplink baseband data at the rate of 20.48 Mbps into the baseband data at the rate of 30.72 Mbps, where the bit width thereof is converted from the original 11 bits to 16 bits.

The first uplink baseband data operation unit 312 receives the first uplink baseband data from the first transceiver module, performs the first uplink data alignment operation on the first uplink baseband data, and the uplink sampled and filtered second uplink baseband data, performs the vector superimposition operation on the first uplink baseband data, and the second uplink baseband data, on which the first uplink data alignment operation is performed, thus obtaining the third uplink baseband data, and sends the third uplink baseband data to the physical layer protocol processing module.

Fourth Embodiment

Figure 8:
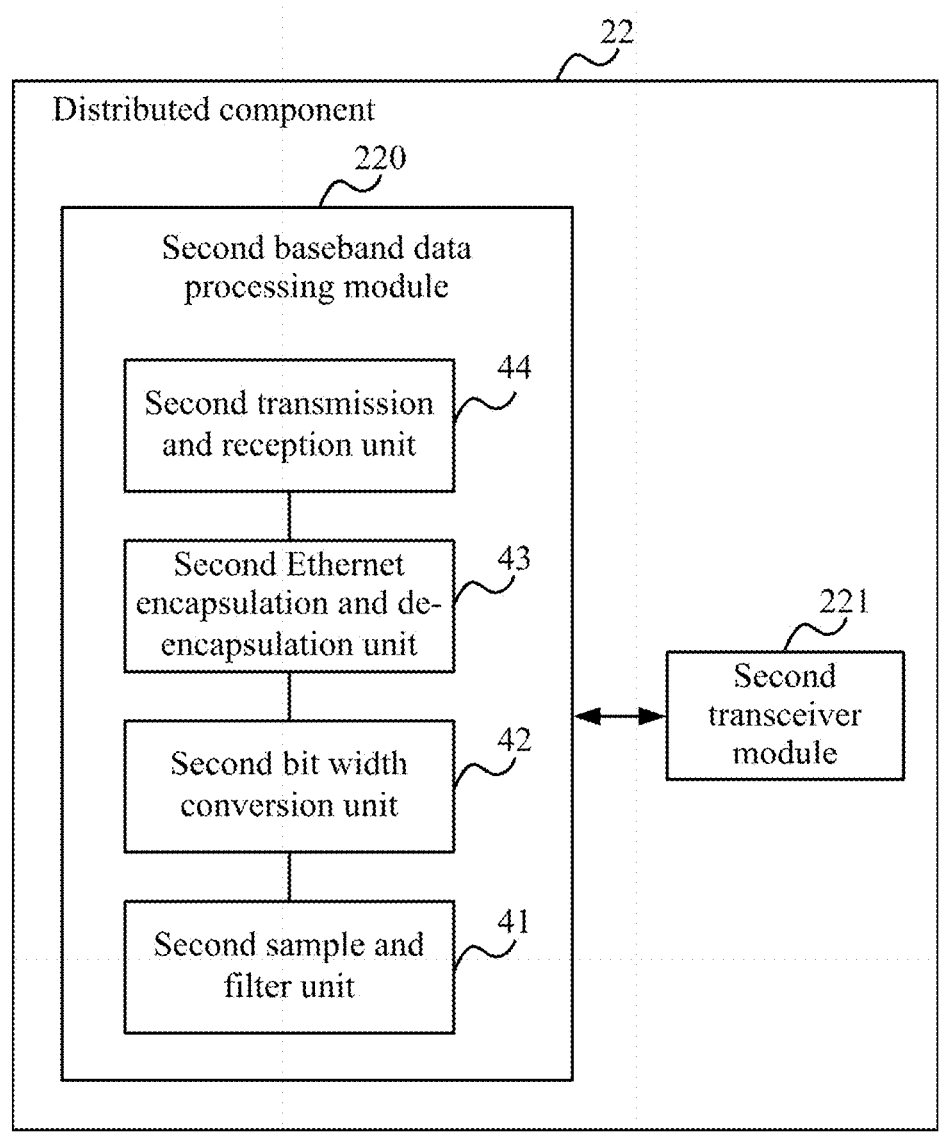
FIG. 8 is a schematic structural diagram of a distributed component according to the fourth embodiment of the invention.

The fourth embodiment of the invention provides a distributed component 22, and FIG. 8 illustrates a schematic structural diagram thereof including a second baseband data processing module 220 and a second transceiver module 221, where:

The second baseband data processing module 220 is configured to receive downlink baseband data through an Ethernet physical layer chip, to Ethernet de-encapsulate and then send the downlink baseband data to the second transceiver module; and to Ethernet encapsulate and then send received second uplink baseband data to the first baseband data processing module according to the third embodiment through the Ethernet physical layer chip; and The second transceiver module 221 is configured to convert the received downlink baseband data into a downlink radio frequency signal, to send the downlink radio frequency signal; to receive a second uplink radio frequency signal from a user equipment in a coverage area thereof, to convert the second uplink radio frequency signal into the second uplink baseband data, and to send the second uplink baseband data to the second baseband data processing module.

Preferably the second baseband data processing module 220 includes a second transmission and reception unit 44, a second Ethernet encapsulation and de-encapsulation unit 43, a second bit width conversion unit 42, and a second sample and filter unit 41, where:

The second transmission and reception unit 44 is configured to send the downlink baseband data received through the Ethernet physical layer chip to the second Ethernet encapsulation and de-encapsulation unit; and to send the received Ethernet encapsulated second uplink baseband data to the first baseband data processing module according to the third embodiment through the Ethernet physical layer chip;

The second Ethernet encapsulation and de-encapsulation unit 43 is configured to Ethernet de-encapsulate and then write the received downlink baseband data into a second memory; to read from the second memory and Ethernet encapsulate the bit width converted second uplink baseband data, and to send the Ethernet encapsulated second uplink baseband data to the second transmission and reception unit;

The second bit width conversion unit 42 is configured to read from the second memory and perform bit width conversion on the Ethernet de-encapsulated downlink baseband data to convert it into the downlink baseband data suitable for processing by the second sample and filter unit, to send the bit width converted downlink baseband data to the second sample and filter unit; to perform bit width conversion on the uplink sampled and filtered second uplink baseband data to convert it into the second uplink baseband data suitable for Ethernet transmission, and to write the second uplink baseband data into the second memory; and The second sample and filter unit 41 is configured to downlink sample and filter, and then send the received bit width converted downlink baseband data to the second transceiver module; and to uplink sample and filter, and then send the received second uplink baseband data from the second transceiver module, to the second bit width conversion unit.

Figure 9:
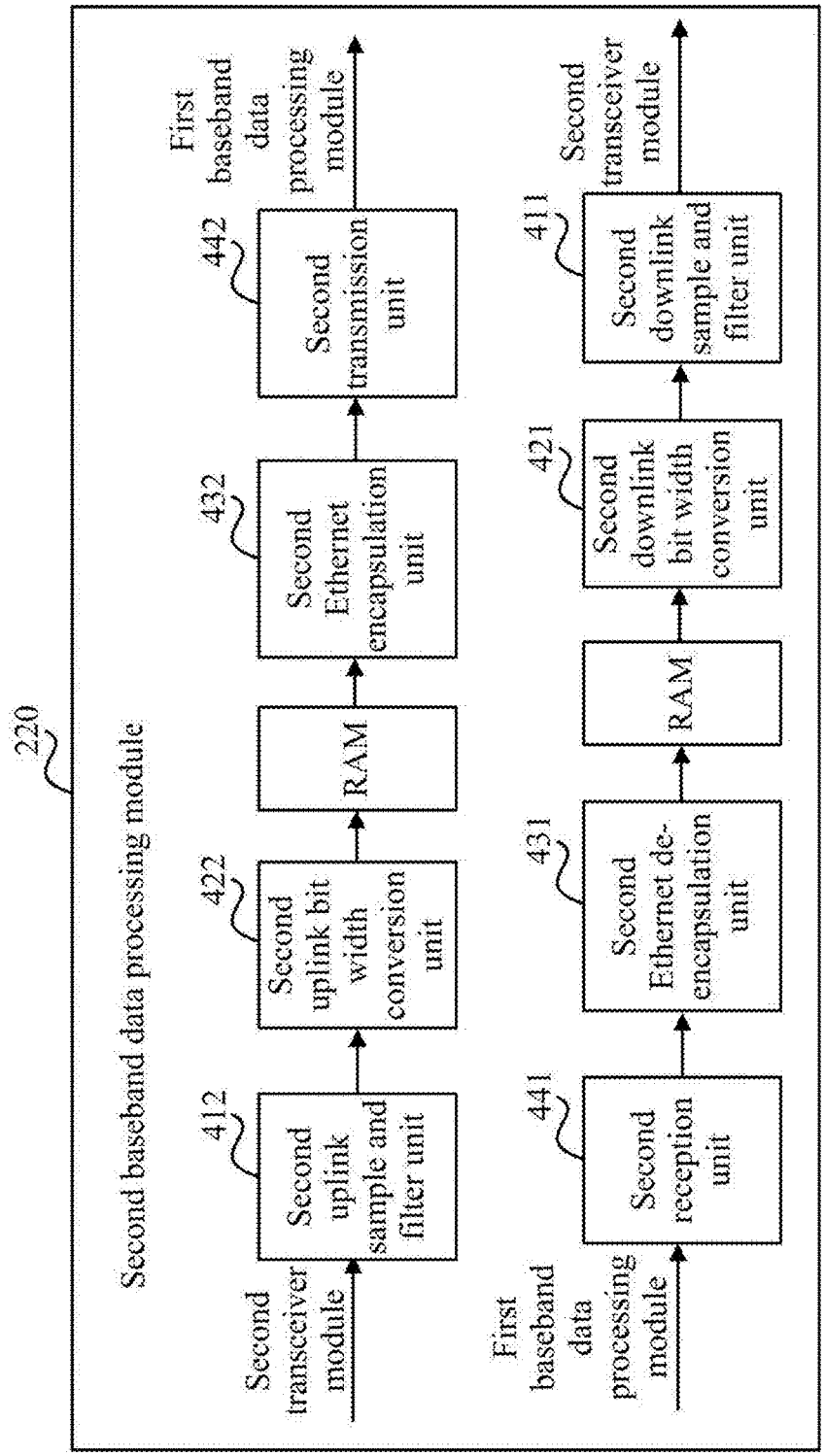
FIG. 9 is a schematic flow chart of processing baseband data in the uplink and the downlink by a second baseband data processing module according to the fourth embodiment of the invention.

FIG. 9 illustrates a flow in which the second baseband data processing module processes the baseband data in the uplink and the downlink, and all the second transmission and reception unit 44, the second Ethernet encapsulation and de-encapsulation unit 43, the second bit width conversion unit 42, and the second sample and filter unit 41 are functionally distinguished in FIG. 9 in the uplink from the downlink, where in FIG. 9, there are a second reception unit 441, a second Ethernet de-encapsulation unit 431, a second downlink bit width conversion unit 421, and a second downlink sample and filter unit 411; and there are a second uplink sample and filter unit 412, a second uplink bit width conversion unit 422, a second Ethernet encapsulation unit 432, and a second transmission unit 442 in the uplink;

Stated otherwise, in FIG. 9, the second reception unit 441 and the second transmission unit 442 constitute the second transmission and reception unit 44, the second Ethernet de-encapsulation unit 431 and the second Ethernet encapsulation unit 432 constitute the second Ethernet encapsulation and de-encapsulation unit 43, the second downlink bit width conversion unit 421 and the second uplink bit width conversion unit 422 constitute the second bit width conversion unit 42, and the second downlink sample and filter unit 411 and the second uplink sample and filter unit 412 constitute the second sample and filter unit 41.

Fifth Embodiment

Figure 10:
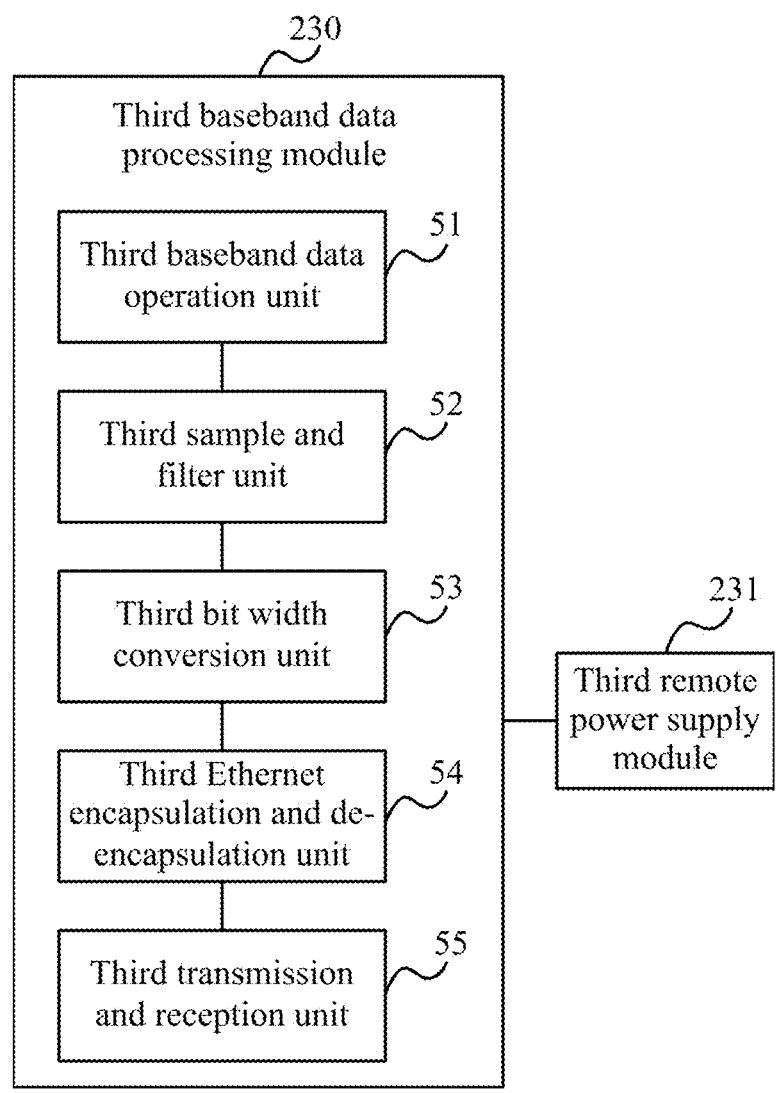
FIG. 10 is a schematic structural diagram of an intermediary component according to the fifth embodiment of the invention.

The fifth embodiment of the invention provides an intermediary component, and FIG. 10 illustrates a schematic structural diagram thereof including a third baseband data processing module 230, where:

The third baseband data processing module 230 is configured to receive downlink baseband data from the first baseband data processing module according to the third embodiment, to Ethernet de-encapsulate the downlink baseband data, to separate the Ethernet de-encapsulated downlink baseband data into at least two branches of downlink baseband data, to perform a second downlink data alignment operation on the at least two branches of downlink baseband data, and to Ethernet encapsulate and then send the at least two branches of downlink baseband data respectively to second baseband data processing modules of corresponding distributed components, where the second downlink data alignment operation enables the at least two branches of downlink baseband data to be sent concurrently by the second transceiver modules of the corresponding distributed components; and to receive at least two branches of second uplink baseband data from the second baseband data processing modules, to Ethernet de-encapsulate the at least two branches of second uplink baseband data respectively, to perform a second uplink data alignment operation and then a vector superimposition operation on the Ethernet de-encapsulated second uplink baseband data to obtain fourth uplink baseband data, and to Ethernet encapsulate and then send the fourth uplink baseband data to the first baseband data processing module, where the second uplink data alignment operation enables the received at least two branches of second uplink baseband data to be sent concurrently to the first baseband data processing module.

Preferably the third baseband data processing module 230 includes a third baseband data operation unit 51, a third sample and filter unit 52, a third bit width conversion unit 53, a third Ethernet encapsulation and de-encapsulation unit 54, and a third transmission and reception unit 55, where:

The third baseband data operation unit 51 is configured to receive the downlink baseband data from the first baseband data processing module, to Ethernet de-encapsulate the downlink baseband data, to separate the Ethernet de-encapsulated downlink baseband data into the at least two branches of downlink baseband data, to perform the second downlink data alignment operation on the at least two branches of downlink baseband data, and to send the at least two branches of downlink baseband data on which the second downlink data alignment operation is performed, to the third sample and filter unit; and to perform the second uplink data alignment operation and then the vector superimposition operation on the uplink sampled and filtered second uplink baseband data to obtain the fourth uplink baseband data, and to Ethernet encapsulate and then send the fourth uplink baseband data to the first baseband data processing module;

The third sample and filter unit 52 is configured to downlink sample and filter, and then send each of the received branches of downlink baseband data respectively to the third bit width conversion unit, and to uplink sample and filter, and then send the received bit width converted second uplink baseband data respectively to a third baseband data processing unit;

The third bit width conversion unit 53 is configured to perform bit width conversion respectively on each of the received branches of downlink sampled and filtered downlink baseband data to convert it into the downlink baseband data suitable for Ethernet transmission, to write the downlink baseband data respectively into a third memory; to read from the third memory and perform bit width conversion respectively on each of the Ethernet de-encapsulated branches of second uplink baseband data to convert it into the second uplink baseband data suitable for processing by the third sample and filter unit, and to send the bit width converted second uplink baseband data respectively to the third sample and filter unit;

The third Ethernet encapsulation and de-encapsulation unit 54 is configured to read and Ethernet encapsulate, and then send the bit width converted downlink baseband data in the third memory respectively to the third transmission and reception unit; and to Ethernet de-encapsulate and then write the received at least one branch of second uplink baseband data respectively into the third memory; and The third transmission and reception unit 55 is configured to send each of the received branches of Ethernet encapsulated downlink baseband data respectively to the corresponding second baseband data processing module through an Ethernet physical layer chip; and to receive and send the at least one branch of second uplink baseband data to the third Ethernet encapsulation and de-encapsulation unit through the Ethernet physical layer chip.

Figure 11:
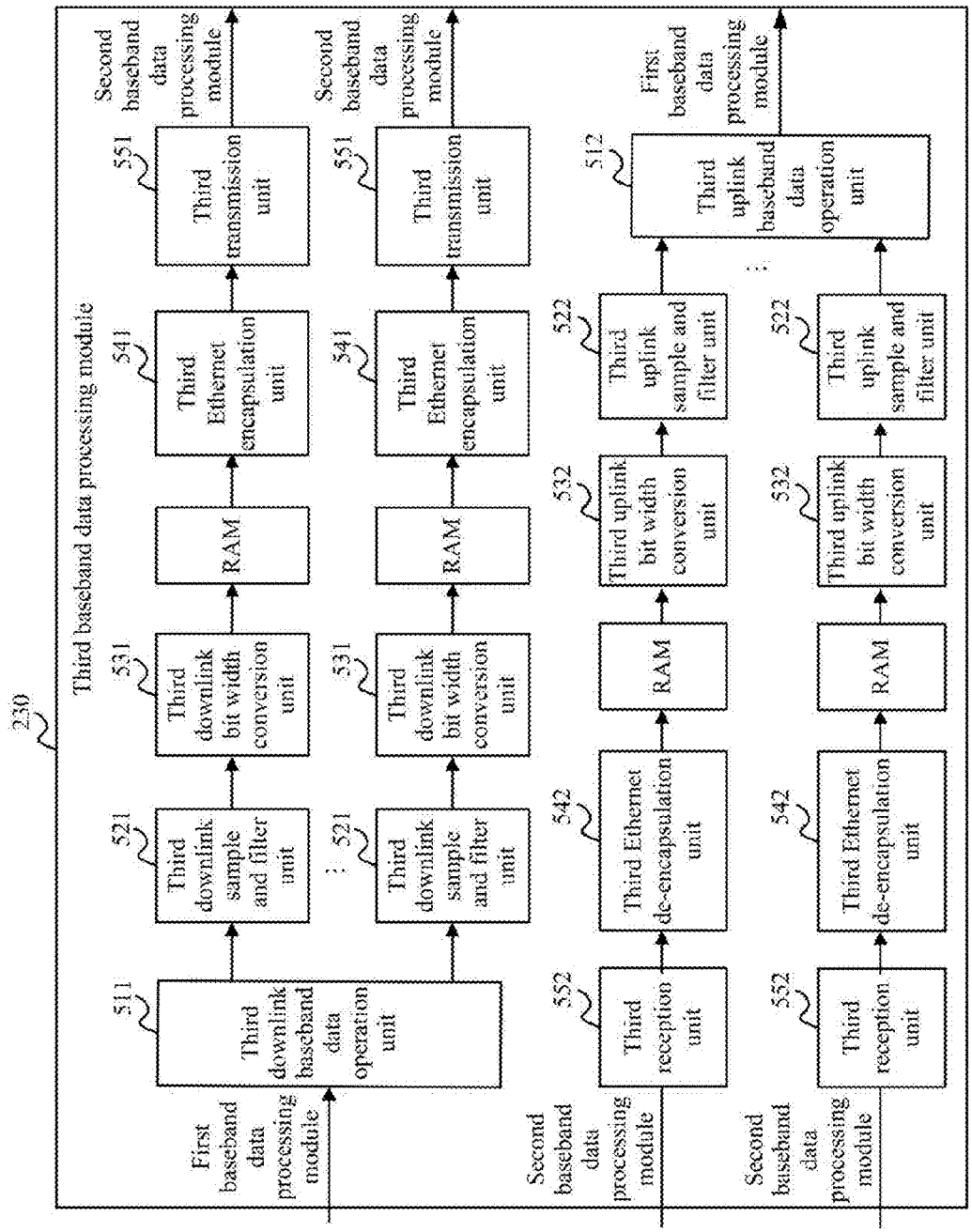
FIG. 11 is a schematic flow chart of processing baseband data in the uplink and the downlink by a third baseband data processing module according to the fifth embodiment of the invention.

FIG. 11 illustrates a flow in which the third baseband data processing module 230 processes the baseband data in the uplink and the downlink, and the third baseband data operation unit 51, the third sample and filter unit 52, the third bit width conversion unit 53, the third Ethernet encapsulation and de-encapsulation unit 54, and the third transmission and reception unit 55 are functionally distinguished in FIG. 11 in the uplink from the downlink; and in FIG. 11, there are a third downlink baseband data operation unit 511, a third downlink sample and filter unit 521, a third downlink bit width conversion unit 531, a third Ethernet encapsulation unit 541, and a third transmission unit 551 in the downlink, and there are a third reception unit 552, a third Ethernet de-encapsulation unit 542, a third uplink bit width conversion unit 532, a third uplink sample and filter unit 522, and a third uplink baseband data operation unit 512 in the uplink; and Stated otherwise, in FIG. 11, the third downlink baseband data operation unit 511 and the third uplink baseband data operation unit 512 constitute the third baseband data operation unit 51, the third downlink sample and filter unit 521 and the third uplink sample and filter unit 522 constitute the third sample and filter unit 52, the third downlink bit width conversion unit 531 and the third uplink bit width conversion unit 532 constitute the third bit width conversion unit 53, the third Ethernet encapsulation unit 541 and the third Ethernet de-encapsulation unit 542 constitute the third Ethernet encapsulation and de-encapsulation unit 54, and the third transmission unit 551 and the third reception unit 552 constitute the third transmission and reception unit 55.

Sixth Embodiment

Figure 12:
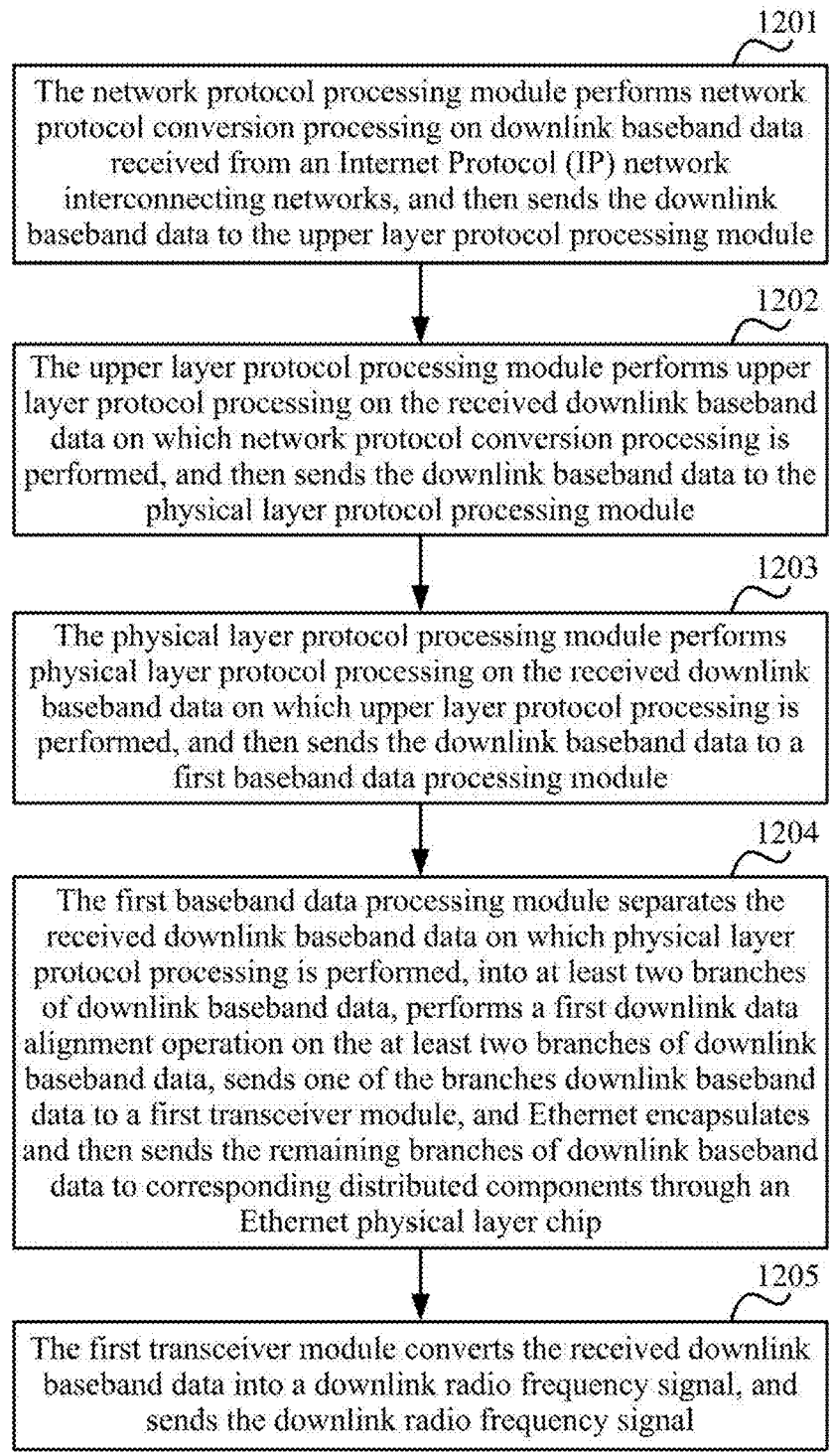
FIG. 12 is a schematic diagram of a downlink data processing method of an extended small cell base station according to the sixth embodiment of the invention.
Figure 13:
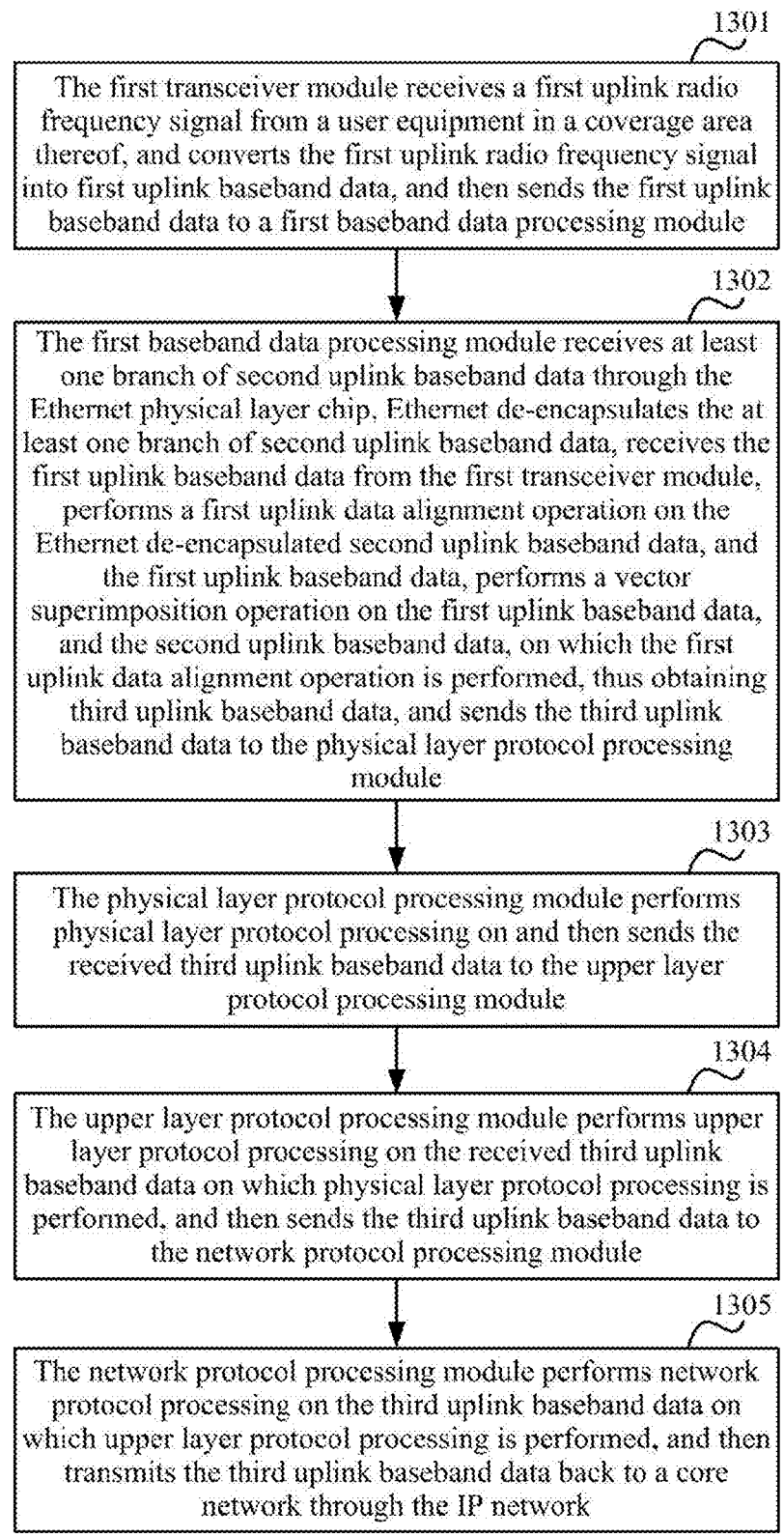
FIG. 13 is a schematic diagram of a downlink data processing method of an extended small cell base station according to the sixth embodiment of the invention.

The sixth embodiment provides a data processing method of the extended small cell base station according to the third embodiment, which includes a downlink data processing method and an uplink data processing method, where FIG. 12 illustrates a flow of the downlink data processing method, and FIG. 13 illustrates a flow of the uplink data processing method.

The flow illustrated in FIG. 12 includes the following steps:

Step 1201: the network protocol processing module performs network protocol conversion processing on downlink baseband data received from an Internet Protocol (IP) network interconnecting networks, and then sends the downlink baseband data to the upper layer protocol processing module;

Step 1202: the upper layer protocol processing module performs upper layer protocol processing on the received downlink baseband data on which network protocol conversion processing is performed, and then sends the downlink baseband data to the physical layer protocol processing module;

Step 1203: the physical layer protocol processing module performs physical layer protocol processing on the received downlink baseband data on which upper layer protocol processing is performed, and then sends the downlink baseband data to a first baseband data processing module;

Step 1204: the first baseband data processing module separates the received downlink baseband data on which physical layer protocol processing is performed, into at least two branches of downlink baseband data, performs a first downlink data alignment operation on the at least two branches of downlink baseband data, sends one of the branches downlink baseband data to a first transceiver module, and Ethernet encapsulates and then sends the remaining branches of downlink baseband data to corresponding distributed components through an Ethernet physical layer chip; and Step 1205: the first transceiver module converts the received downlink baseband data into a downlink radio frequency signal, and sends the downlink radio frequency signal.

The flow illustrated in FIG. 13 includes the following steps:

Step 1301: the first transceiver module receives a first uplink radio frequency signal from a user equipment in a coverage area thereof, and converts the first uplink radio frequency signal into first uplink baseband data, and then sends the first uplink baseband data to a first baseband data processing module;

Step 1302: the first baseband data processing module receives at least one branch of second uplink baseband data through the Ethernet physical layer chip, Ethernet de-encapsulates the at least one branch of second uplink baseband data, receives the first uplink baseband data from the first transceiver module, performs a first uplink data alignment operation on the Ethernet de-encapsulated second uplink baseband data, and the first uplink baseband data, performs a vector superimposition operation on the first uplink baseband data, and the second uplink baseband data, on which the first uplink data alignment operation is performed, thus obtaining third uplink baseband data, and sends the third uplink baseband data to the physical layer protocol processing module;

Step 1303: the physical layer protocol processing module performs physical layer protocol processing on and then sends the received third uplink baseband data to the upper layer protocol processing module;

Step 1304: the upper layer protocol processing module performs upper layer protocol processing on the received third uplink baseband data on which physical layer protocol processing is performed, and then sends the third uplink baseband data to the network protocol processing module; and Step 1305: the network protocol processing module performs network protocol processing on the third uplink baseband data on which upper layer protocol processing is performed, and then transmits the third uplink baseband data back to a core network through the IP network.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A small cell base station system, comprising an extended small cell base station and at least one distributed component node, wherein:

the extended small cell base station is configured to perform network protocol processing, upper layer protocol processing, and physical layer protocol processing sequentially on downlink baseband data received from an Internet Protocol (IP) protocol network interconnecting networks, and then separate the downlink baseband data into at least two branches of downlink baseband data, to perform a first downlink data alignment operation on the at least two branches of downlink baseband data, to convert one of the branches of downlink baseband data into a downlink radio frequency signal and then send the downlink radio frequency signal, and to Ethernet encapsulate and then send the remaining branches of downlink baseband data respectively to the corresponding distributed component nodes through an Ethernet physical layer chip, wherein the first downlink data alignment operation enables the at least two branches of downlink baseband data to be sent concurrently by the extended small cell base station and the corresponding distributed component nodes; and to receive at least one branch of second uplink baseband data through the Ethernet physical layer chip, to Ethernet de-encapsulate the at least one branch of second uplink baseband data, to receive a first uplink radio frequency signal of a user equipment in a coverage area thereof, to convert the first uplink radio frequency signal into first uplink baseband data, to perform a first uplink data alignment operation on the Ethernet de-encapsulated second uplink baseband data and the first uplink baseband data, to perform a vector superimposition operation on the first uplink baseband data, and the second uplink baseband data, on which the first uplink data alignment operation is performed, thus obtaining third uplink baseband data, and to perform physical layer protocol processing, upper layer protocol processing, and network protocol processing sequentially on and then send the third uplink baseband data, wherein the first uplink data alignment operation enables physical layer protocol processing to be performed concurrently on the first uplink baseband data and the second uplink baseband data, and two baseband data frames are aligned with respect to a stored local reference frame in an uplink data alignment, and the vector superimposition operation makes a superimposed data frame having a same size as a size of the two baseband data frames; and the distributed component node is configured to receive the downlink baseband data from the extended small cell base station through the Ethernet physical layer chip, to Ethernet de-encapsulate the downlink baseband data into a downlink radio frequency signal and then send the downlink radio frequency signal; to receive a second uplink radio frequency signal from a user equipment in a coverage area thereof, to convert the second uplink radio frequency signal into second uplink baseband data and then Ethernet encapsulate the second uplink baseband data, and to send the Ethernet encapsulated second uplink baseband data to the extended small cell base station through the Ethernet physical layer chip.

2. The small cell base station system according to claim 1, wherein the extended small cell base station comprises a network protocol processing module, an upper layer protocol processing module, a physical layer protocol processing module, a first baseband data processing module, and a first transceiver circuit, wherein:

each of the modules is stored in non-transitory computer-readable media;

the network protocol processing module is configured to perform network protocol conversion processing on the downlink baseband data received from the Internet Protocol (IP) protocol network interconnecting the networks and then send the downlink baseband data to the upper layer protocol processing module; and to perform network protocol conversion processing on the third uplink baseband data on which upper layer protocol processing is performed, and then transmit the third uplink baseband data back to a core network through the IP network;

the upper layer protocol processing module is configured to perform upper layer protocol processing on the received downlink baseband data on which network protocol conversion processing is performed, and then send the downlink baseband data to the physical layer protocol processing module; and to perform upper layer protocol processing on the received third uplink baseband data on which physical layer protocol processing is performed, and then send the third uplink baseband data to the network protocol processing module;

the physical layer protocol processing module is configured to perform physical layer protocol processing on the received downlink baseband data on which uplink protocol processing is performed, and then send the downlink baseband data to the first baseband data processing module; and to perform physical layer protocol processing on the received third uplink baseband data, and then send the third uplink baseband data to the upper layer protocol processing module;

the first baseband data processing module is configured to separate the received downlink baseband data on which physical layer protocol processing is performed, into the at least two branches of downlink baseband data, to perform the first downlink data alignment operation on the at least two branches of downlink baseband data, to send the one of branches of downlink baseband data to the first transceiver circuit, and to Ethernet encapsulate and then send the remaining branches of downlink baseband data respectively to the corresponding distributed component nodes through the Ethernet physical layer chip; and to receive the at least one branch of second uplink baseband data through the Ethernet physical layer chip, to Ethernet de-encapsulate the at least one branch of second uplink baseband data, to receive the first uplink baseband data from the first transceiver circuit, to perform the first uplink data alignment operation on the Ethernet de-encapsulated second uplink baseband data and the first uplink baseband data, to perform the vector superimposition operation on the first uplink baseband data, and the second uplink baseband data, on which the first uplink data alignment operation is performed, thus obtaining the third uplink baseband data, and to send the third uplink baseband data to the physical layer protocol processing module; and the first transceiver circuit is configured to convert the received downlink baseband data into the downlink radio frequency signal and send the downlink radio frequency signal; to receive the first uplink radio frequency signal from the user equipment in the coverage area thereof, and to convert the first uplink radio frequency signal into the first uplink baseband data, and then send the first uplink baseband data to the first baseband data processing module.

3. The small cell base station system according to claim 1, wherein the distributed component node comprises a second baseband data processing module and a second transceiver circuit, wherein:

the second baseband data processing module is stored in non-transitory computer-readable media and configured to receive the downlink baseband data from the extended small cell base station through the Ethernet physical layer chip, to Ethernet de-encapsulate and then send the downlink baseband data to the second transceiver circuit; and to Ethernet encapsulate and then send the received second uplink baseband data to the extended small cell base station through the Ethernet physical layer chip; and the second transceiver circuit is configured to convert the received downlink baseband data into the downlink radio frequency signal; and then send the downlink radio frequency signal, to receive the second uplink radio frequency signal from the user equipment in the coverage area thereof, to convert the second uplink radio frequency signal into the second uplink baseband data, and then send the second uplink baseband data to the second baseband data processing module.

4. The small cell base station system according to claim 1, wherein the small cell base station system further comprises at least one intermediary component node, each intermediary component node connected with at least two of the distributed component nodes and the extended small cell base station;

the extended small cell base station is further configured to Ethernet encapsulate and then send the remaining branches of downlink baseband data respectively to the corresponding distributed component nodes through the Ethernet physical layer chip; and to receive fourth uplink baseband data from the intermediary component node through the Ethernet physical layer chip, to Ethernet de-encapsulate the fourth uplink baseband data, to perform a third uplink data alignment operation on the Ethernet de-encapsulated fourth uplink baseband data, second uplink baseband data and first uplink baseband data, to perform the vector superimposition operation on the first uplink baseband data, the second uplink baseband data, and the fourth uplink baseband data, on which the third uplink data alignment operation is performed, to obtain fifth uplink baseband data, and to send the fifth uplink baseband data to a physical layer protocol processing module stored in non-transitory computer-readable media, wherein the third uplink data alignment operation enables physical layer protocol processing concurrently to be performed on the first uplink baseband data, the second uplink baseband data and the fourth uplink baseband data;

the intermediary component node is configured to receive the downlink baseband data from the extended small cell base station, to Ethernet de-encapsulate the downlink baseband data, to separate the Ethernet de-encapsulated downlink baseband data into the at least two branches of downlink baseband data, to perform a second downlink data alignment operation on the at least two branches of downlink baseband data, and to Ethernet encapsulate and then send the at least two branches of downlink baseband data respectively to the corresponding distributed component nodes, wherein the second downlink data alignment operation enables the at least two branches of downlink baseband data to be sent concurrently by the corresponding distributed component nodes; and to receive at least two branches of second uplink baseband data from the distributed component node, to Ethernet de-encapsulate the at least two branches of second uplink baseband data respectively, to perform a second uplink data alignment operation and then a vector superimposition operation on the Ethernet de-encapsulated second uplink baseband data to obtain fourth uplink baseband data, and to Ethernet encapsulate and then send the fourth uplink baseband data to the extended small cell base station, wherein the second uplink data alignment operation enables the received at least two branches of second uplink baseband data to be sent concurrently to the extended small cell base station; and the distributed component node is further configured to receive the downlink baseband data from the intermediary component node, to Ethernet de-encapsulate and then convert the downlink baseband data into the downlink radio frequency signal, to send the downlink radio frequency signal, and to send the Ethernet de-encapsulated second uplink baseband data to the intermediary component node through the Ethernet physical layer chip.

5. An extended small cell base station, comprising: a network protocol processing module, an upper layer protocol processing module, a physical layer protocol processing module, a first baseband data processing module, and a first transceiver circuit, wherein:

each of the modules is stored in non-transitory computer-readable media;

the network protocol processing module is configured to perform network protocol conversion processing on downlink baseband data received from an Internet Protocol (IP) protocol network interconnecting networks and then send the downlink baseband data to the upper layer protocol processing module, and to perform network protocol conversion processing on third uplink baseband data on which upper layer protocol processing is performed, and then transmit the third uplink baseband data back to a core network through the IP network;

the upper layer protocol processing module is configured to perform upper layer protocol processing on the received downlink baseband data on which network protocol conversion processing is performed, and then send the downlink baseband data to the physical layer protocol processing module, and to perform upper layer protocol processing on the received third uplink baseband data on which physical layer protocol processing is performed, and then send the third uplink baseband data to the network protocol processing module;

the physical layer protocol processing module is configured to perform physical layer protocol processing on the received downlink baseband data on which uplink protocol processing is performed, and then send the downlink baseband data to the first baseband data processing module; and to perform physical layer protocol processing on the received third uplink baseband data, and then send the third uplink baseband data to the upper layer protocol processing module;

the first baseband data processing module is configured to separate the received downlink baseband data on which physical layer protocol processing is performed, into at least two branches of downlink baseband data, to perform a first downlink data alignment operation on the at least two branches of downlink baseband data, to send one of the branches of downlink baseband data to the first transceiver circuit, and to Ethernet encapsulate and then send the remaining branches of downlink baseband data respectively to second baseband data processing modules of corresponding distributed component nodes through an Ethernet physical layer chip, wherein the first downlink data alignment operation enables the at least two branches of downlink baseband data to be sent concurrently by the first transceiver circuit, and second transceiver circuits of the corresponding distributed component nodes; and to receive at least one branch of second uplink baseband data through the Ethernet physical layer chip, to Ethernet de-encapsulate the at least one branch of second uplink baseband data, to receive first uplink baseband data from the first transceiver circuits, to perform a first uplink data alignment operation on the Ethernet de-encapsulated second uplink baseband data and the first uplink baseband data, to perform a vector superimposition operation on the first uplink baseband data, and the second uplink baseband data, on which the first uplink data alignment operation is performed, thus obtaining third uplink baseband data, and to send the third uplink baseband data to the physical layer protocol processing module, wherein the first uplink data alignment operation enables the first uplink baseband data and the second uplink baseband data to be sent concurrently to the physical layer protocol processing module, and two baseband data frames are aligned with respect to a stored local reference frame in an uplink data alignment, and the vector superimposition operation makes a superimposed data frame having a same size as a size of the two baseband data frames; and the first transceiver circuit is configured to convert the received downlink baseband data into the downlink radio frequency signal and send the downlink radio frequency signal, to receive a first uplink radio frequency signal from a user equipment in a coverage area thereof, and to convert the first uplink radio frequency signal into the first uplink baseband data, and then send the first uplink baseband data to the first baseband data processing module.

6. The extended small cell base station according to claim 5, wherein the first baseband data processing module is further configured to Ethernet encapsulate and then send the remaining branches of downlink baseband data respectively to third baseband data processing modules of corresponding intermediary component nodes through the Ethernet physical layer chip; and to receive fourth uplink baseband data from the third baseband data processing modules through the Ethernet physical layer chip, to Ethernet de-encapsulate the fourth uplink baseband data, to perform a third uplink data alignment operation on the Ethernet de-encapsulated fourth uplink baseband data, second uplink baseband data and first uplink baseband data, to perform a vector superimposition operation on the first uplink baseband data, the second uplink baseband data and the fourth uplink baseband data, on which the third uplink data alignment operation is performed, to obtain fifth uplink baseband data, and to send the fifth uplink baseband data to the physical layer protocol processing module, wherein the third uplink data alignment operation enables the first uplink baseband data, the second uplink baseband data and the fourth uplink baseband data to be sent concurrently to the physical layer protocol processing module.

7. The extended small cell base station according to claim 5, wherein the first baseband data processing module comprises a first baseband data operation unit, a first sample and filter unit, a first bit width conversion unit, a first Ethernet encapsulation and de-encapsulation unit, and a first transmission and reception unit, wherein:

each of the units is stored in the non-transitory computer-readable media;

the first baseband data operation unit is configured to separate the received downlink baseband data on which physical layer protocol processing is performed, into the at least two branches of downlink baseband data, to perform the first downlink data alignment operation on the at least two branches of downlink baseband data, to send the one of branches of downlink baseband data to the first transceiver circuit, to send the remaining branches of downlink baseband data to the first sample and filter unit; to receive the first uplink baseband data from the first transceiver circuit, to perform the first uplink data alignment operation on the first uplink baseband data, and the uplink sampled and filtered second uplink baseband data, to perform the vector superimposition operation on the first uplink baseband data, and the second uplink baseband data, on which the first uplink data alignment operation is performed, thus obtaining the third uplink baseband data, and to send the third uplink baseband data to the physical layer protocol processing module thereof;

the first sample and filter unit is configured to downlink sample and filter, and then send each of the received branches of downlink baseband data to the first bit width conversion unit; and to uplink sample and filter, and then send the received bit width converted second uplink baseband data to the first baseband data operation unit;

the first bit width conversion unit is configured to bit width convert the received downlink sampled and filtered downlink baseband data into the downlink baseband data suitable for Ethernet transmission, to write the downlink baseband data into a first memory; to read from the first memory and bit width convert each of the Ethernet de-encapsulated branches of second uplink baseband data into the second uplink baseband data suitable for processing by the first sample and filter unit, and to send the bit width converted second uplink baseband data to the first sample and filter unit;

the first Ethernet encapsulation and de-encapsulation unit is configured to read and Ethernet encapsulate, and then send the bit width converted downlink baseband data in the first memory to the first transmission and reception unit; and to Ethernet de-encapsulate and then write the at least one received branch of second uplink baseband data into the first memory; and the first transmission and reception unit is configured to send the received Ethernet encapsulated downlink baseband data to the corresponding second transceiver circuits through the Ethernet physical layer chip; and to receive and send the at least one branch of second uplink baseband data to the first Ethernet encapsulation and de-encapsulation unit through the Ethernet physical layer chip.

8. The extended small cell base station according to claim 5, wherein separating the received downlink baseband data on which physical layer protocol processing is performed, into the at least two branches of downlink baseband data comprises:

if the received downlink baseband data on which physical layer protocol processing is performed is the same, then duplicating the downlink baseband data on which physical layer protocol processing is performed, into the at least two branches of downlink baseband data; and if the received downlink baseband data on which physical layer protocol processing is performed is not the same, then separating the downlink baseband data on which physical layer protocol processing is performed, into the at least two different branches of downlink baseband data.

9. The extended small cell base station according to claim 5, wherein the extended small cell base station further comprises a first remote power supply circuit configured to feed an electric signal into a network line or an optical fiber, and to transmit the electric signal and the downlink baseband data concurrently to the distributed component node.

10. An intermediary component node, comprising a third baseband data processing module, wherein:

the third baseband data processing module is configured to receive downlink baseband data from a first baseband data processing module of an extended small cell base station, to Ethernet de-encapsulate the downlink baseband data, to separate the Ethernet de-encapsulated downlink baseband data into at least two branches of downlink baseband data, to perform a second downlink data alignment operation on the at least two branches of downlink baseband data, and to Ethernet encapsulate and then send the at least two branches of downlink baseband data respectively to second baseband data processing modules of corresponding distributed component nodes, where the second downlink data alignment operation enables the at least two branches of downlink baseband data to be sent concurrently by second transceiver circuits of the corresponding distributed component nodes; and to receive at least two branches of second uplink baseband data from the second baseband data processing modules, to Ethernet de-encapsulate the at least two branches of second uplink baseband data respectively, to perform a second uplink data alignment operation and then a vector superimposition operation on the Ethernet de-encapsulated second uplink baseband data to obtain fourth uplink baseband data, and to Ethernet encapsulate and then send the fourth uplink baseband data to the first baseband data processing module, where the second uplink data alignment operation enables the received at least two branches of second uplink baseband data to be sent concurrently to the first baseband data processing module, and two baseband data frames are aligned with respect to a stored local reference frame in an uplink data alignment, and the vector superimposition operation makes a superimposed data frame having a same size as a size of the two baseband data frames; and each of the modules is stored in non-transitory computer-readable media.

11. The intermediary component node according to claim 10, wherein the third baseband data processing module comprises a third baseband data operation unit, a third sample and filter unit, a third bit width conversion unit, a third Ethernet encapsulation and de-encapsulation unit, and a third transmission and reception unit, wherein:

each of the units is stored in the non-transitory computer-readable media;

the third baseband data operation unit is configured to receive the downlink baseband data from the first baseband data processing module, to Ethernet de-encapsulate the downlink baseband data, to separate the Ethernet de-encapsulated downlink baseband data into the at least two branches of downlink baseband data, to perform the second downlink data alignment operation on the at least two branches of downlink baseband data, and to send the at least two branches of downlink baseband data on which the second downlink data alignment operation is performed, to the third sample and filter unit; and to perform the second uplink data alignment operation and then the vector superimposition operation on the uplink sampled and filtered second uplink baseband data to obtain the fourth uplink baseband data, and to Ethernet encapsulate and then send the fourth uplink baseband data to the first baseband data processing module;

the third sample and filter unit is configured to downlink sample and filter, and then send each of the received branches of downlink baseband data respectively to the third bit width conversion unit; and to uplink sample and filter, and then send the received bit width converted second uplink baseband data respectively to a third baseband data processing unit;

the third bit width conversion unit is configured to perform bit width conversion respectively on each of the received branches of downlink sampled and filtered downlink baseband data to convert it into the downlink baseband data suitable for Ethernet transmission, to write the downlink baseband data respectively into a third memory; to read from the third memory and perform bit width conversion respectively on each of the Ethernet de-encapsulated branches of second uplink baseband data to convert it into the second uplink baseband data suitable for processing by the third sample and filter unit, and to send the bit width converted second uplink baseband data respectively to the third sample and filter unit;

the third Ethernet encapsulation and de-encapsulation unit is configured to read and Ethernet encapsulate, and then send the bit width converted downlink baseband data in the third memory respectively to the third transmission and reception unit; and to Ethernet de-encapsulate and then write the received at least one branch of second uplink baseband data respectively into the third memory; and the third transmission and reception unit is configured to send each of the received branches of Ethernet encapsulated downlink baseband data respectively to the corresponding second baseband data processing module through an Ethernet physical layer chip, and to receive and send the at least one branch of second uplink baseband data to the third Ethernet encapsulation and de-encapsulation unit through the Ethernet physical layer chip.

12. The intermediary component node according to claim 10, wherein the intermediary component node further comprises a third remote power supply circuit configured to feed an electric signal into a network line or an optic fiber and to transmit the electric signal and the downlink baseband data concurrently to the distributed component node connected therewith.

13. A data processing method of the extended small cell base station according to claim 5, comprising a downlink data processing method and an uplink data processing method, wherein:

the downlink data processing method comprises:

performing, by the network protocol processing module, network protocol conversion processing on downlink baseband data received from an Internet Protocol (IP) network interconnecting networks, and then sending the downlink baseband data to the upper layer protocol processing module;

performing, by the upper layer protocol processing module, upper layer protocol processing on the received downlink baseband data on which network protocol conversion processing is performed, and then sending the downlink baseband data to the physical layer protocol processing module;

performing, by the physical layer protocol processing module, physical layer protocol processing on the received downlink baseband data on which upper layer protocol processing is performed, and then sending the downlink baseband data to a first baseband data processing module;

separating, by the first baseband data processing module, the received downlink baseband data on which physical layer protocol processing is performed, into at least two branches of downlink baseband data, performing a first downlink data alignment operation on the at least two branches of downlink baseband data, sending one of the branches of downlink baseband data to a first transceiver circuit, and Ethernet encapsulating and then sending the remaining branches of downlink baseband data to corresponding distributed component nodes through an Ethernet physical layer chip; and converting, by the first transceiver circuit, the received downlink baseband data into a downlink radio frequency signal, and sending the downlink radio frequency signal, the uplink data processing method comprises:

receiving, by the first transceiver circuit, a first uplink radio frequency signal from a user equipment in a coverage area thereof, and converting the first uplink radio frequency signal into first uplink baseband data, and then sending the first uplink baseband data to a first baseband data processing module;

receiving, by the first baseband data processing module, at least one branch of second uplink baseband data through the Ethernet physical layer chip, Ethernet de-encapsulating the at least one branch of second uplink baseband data, receiving the first uplink baseband data from the first transceiver circuit, performing a first uplink data alignment operation on the Ethernet de-encapsulated second uplink baseband data, and the first uplink baseband data, performing a vector superimposition operation on the first uplink baseband data, and the second uplink baseband data, on which the first uplink data alignment operation is performed, thus obtaining third uplink baseband data, and sending the third uplink baseband data to the physical layer protocol processing module, and two baseband data frames are aligned with respect to a stored local reference frame in an uplink data alignment, and the vector superimposition operation makes a superimposed data frame having a same size as a size of the two baseband data frames;

performing, by the physical layer protocol processing module, physical layer protocol processing on and then sending the received third uplink baseband data to the upper layer protocol processing module;

performing, by the upper layer protocol processing module, upper layer protocol processing on the received third uplink baseband data on which physical layer protocol processing is performed, and then sending the third uplink baseband data to the network protocol processing module; and performing, by the network protocol processing module, network protocol processing on the third uplink baseband data on which upper layer protocol processing is performed, and then transmitting the third uplink baseband data back to a core network through the IP network.

14. The extended small cell base station according to claim 6, wherein separating the received downlink baseband data on which physical layer protocol processing is performed, into the at least two branches of downlink baseband data comprises:

if the received downlink baseband data on which physical layer protocol processing is performed is the same, then duplicating the downlink baseband data on which physical layer protocol processing is performed, into the at least two branches of downlink baseband data; and if the received downlink baseband data on which physical layer protocol processing is performed is not the same, then separating the downlink baseband data on which physical layer protocol processing is performed, into the at least two different branches of downlink baseband data.

15. The extended small cell base station according to claim 7, wherein separating the received downlink baseband data on which physical layer protocol processing is performed, into the at least two branches of downlink baseband data comprises:

if the received downlink baseband data on which physical layer protocol processing is performed is the same, then duplicating the downlink baseband data on which physical layer protocol processing is performed, into the at least two branches of downlink baseband data; and if the received downlink baseband data on which physical layer protocol processing is performed is not the same, then separating the downlink baseband data on which physical layer protocol processing is performed, into the at least two different branches of downlink baseband data.

16. The extended small cell base station according to claim 6, wherein the extended small cell base station further comprises a first remote power supply circuit configured to feed an electric signal into a network line or an optical fiber, and to transmit the electric signal and the downlink baseband data concurrently to the distributed component node.

17. The extended small cell base station according to claim 7, wherein the extended small cell base station further comprises a first remote power supply circuit configured to feed an electric signal into a network line or an optical fiber, and to transmit the electric signal and the downlink baseband data concurrently to the distributed component node.

18. The intermediary component node according to claim 11, wherein the intermediary component node further comprises a third remote power supply circuit configured to feed an electric signal into a network line or an optic fiber and to transmit the electric signal and the downlink baseband data concurrently to the distributed component node connected therewith.

* * * * *